(12) United States Patent
Elshafie et al.

(10) Patent No.: US 11,716,720 B2
(45) Date of Patent: Aug. 1, 2023

(54) SEMI-PERSISTENT SCHEDULING DESIGNS FOR RELAYING

(71) Applicant: QUALCOMM Incorporated, San Diego, CA (US)

(72) Inventors: Ahmed Elshafie, San Diego, CA (US); Seyedkianoush Hosseini, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/186,327

(22) Filed: Feb. 26, 2021

(65) Prior Publication Data
US 2022/0279542 A1  Sep. 1, 2022

(51) Int. Cl.
*H04W 72/1263* (2023.01)
*H04W 76/12* (2018.01)
(Continued)

(52) U.S. Cl.
CPC ....... *H04W 72/1263* (2013.01); *H04L 1/1896* (2013.01); *H04W 72/02* (2013.01);
(Continued)

(58) Field of Classification Search
CPC ............. H04W 72/1263; H04W 72/02; H04W 72/1257; H04W 76/12; H04W 76/11; H04W 80/02; H04W 88/04; H04L 1/1896
See application file for complete search history.

(56) References Cited

U.S. PATENT DOCUMENTS

2020/0092685 A1 * 3/2020 Fehrenbach ............ H04W 4/46
2020/0305139 A1 * 9/2020 Xu ..................... H04W 72/0406
(Continued)

FOREIGN PATENT DOCUMENTS

TW             I753283 B  *  1/2022
WO    WO-2018172857 A1 *  9/2018  ........ H04W 28/0215

OTHER PUBLICATIONS

Ericsson: "Uu Enhancements for V2X", 3GPP Draft, 3GPP TSG RAN WG1 Meeting #84bis, R1-162831-UU Enhancements, 3rd Generation Partnership Project (3GPP), Mobile Competence Centre, 650, Route Des Lucioles, F-06921, Sophia-Antipolis Cedex, France, vol. RAN WG1, No. Busan, Apr. 11, 2016-Apr. 15, 2016, Apr. 1, 2016 (Apr. 1, 2016), XP051079714, 3 Pages, Retrieved from the Internet: URL: http://www.3gpp.org/ftp/tsg_ran/WG1_RL1/TSGR1_84b/Docs/ [retrieved on Apr. 1, 2016] Section 2.1.
(Continued)

*Primary Examiner* — Saad A. Waqas
(74) *Attorney, Agent, or Firm* — Loza & Loza, LLP

(57) ABSTRACT

Aspects relate to semi-persistent scheduling (SPS) designs for relay communication in sidelink networks. A scheduling entity, such as a base station and/or sidelink device, may configure an SPS configuration for relaying a packet from a source device to a destination device (e.g., the base station or destination sidelink device) via at least one relay device in a relay sidelink tunnel. SPS information associated with the SPS configuration may be provided to the source device and relay device(s). The SPS information may include, for example, periodic transmit occasions for the source device and the relay device(s). The periodic transmit occasions may include periodic uplink occasions and/or periodic sidelink occasions for groupcast and/or unicast relay transmission. Periodic feedback occasions may further be configured for
(Continued)

providing feedback information (e.g., an acknowledgement or negative acknowledgement).

30 Claims, 23 Drawing Sheets

(51) Int. Cl.
  *H04W 76/11* (2018.01)
  *H04L 1/1867* (2023.01)
  *H04W 72/02* (2009.01)
  *H04W 80/02* (2009.01)
  *H04W 88/04* (2009.01)
  *H04W 72/50* (2023.01)

(52) U.S. Cl.
  CPC .......... *H04W 72/535* (2023.01); *H04W 76/11* (2018.02); *H04W 76/12* (2018.02); *H04W 80/02* (2013.01); *H04W 88/04* (2013.01)

(56) References Cited

U.S. PATENT DOCUMENTS

2021/0059005 A1* 2/2021 Hosseini ............... H04W 48/16
2022/0022279 A1* 1/2022 Kim ...................... H04W 76/14

OTHER PUBLICATIONS

International Search Report and Written Opinion—PCT/US2022/016334—ISA/EPO—dated Jun. 2, 2022.
Nokia, et al., "Sidelink Resource Allocation with Relay UE", 3GPP Daft, 3GPP TSG RAN WG1 Meeting #89, R1-1708564, Sidelink Resource Allocation with Relay UE V2, 3rd Generation Partnership Project (3GPP), Mobile Competence Centre, 650, Route Des Lucioles, F-06921 Sophia-Antipolis Cedex, F, vol. RAN WG1, No. Hangzhou, China, May 15, 2017-May 19, 2017, May 14, 2017 (May 14, 2017), XP051273756, pp. 1-7, Retrieved from the Internet: URL: http://www.3gpp.org/ftp/Meetings_3GPP_SYNC/RAN1/Docs/. [Retrieved on May 14, 2017], section 2, figure 2, p. 2-p. 3, p. 3, figure 2, Section 4, seventh paragraph.

* cited by examiner

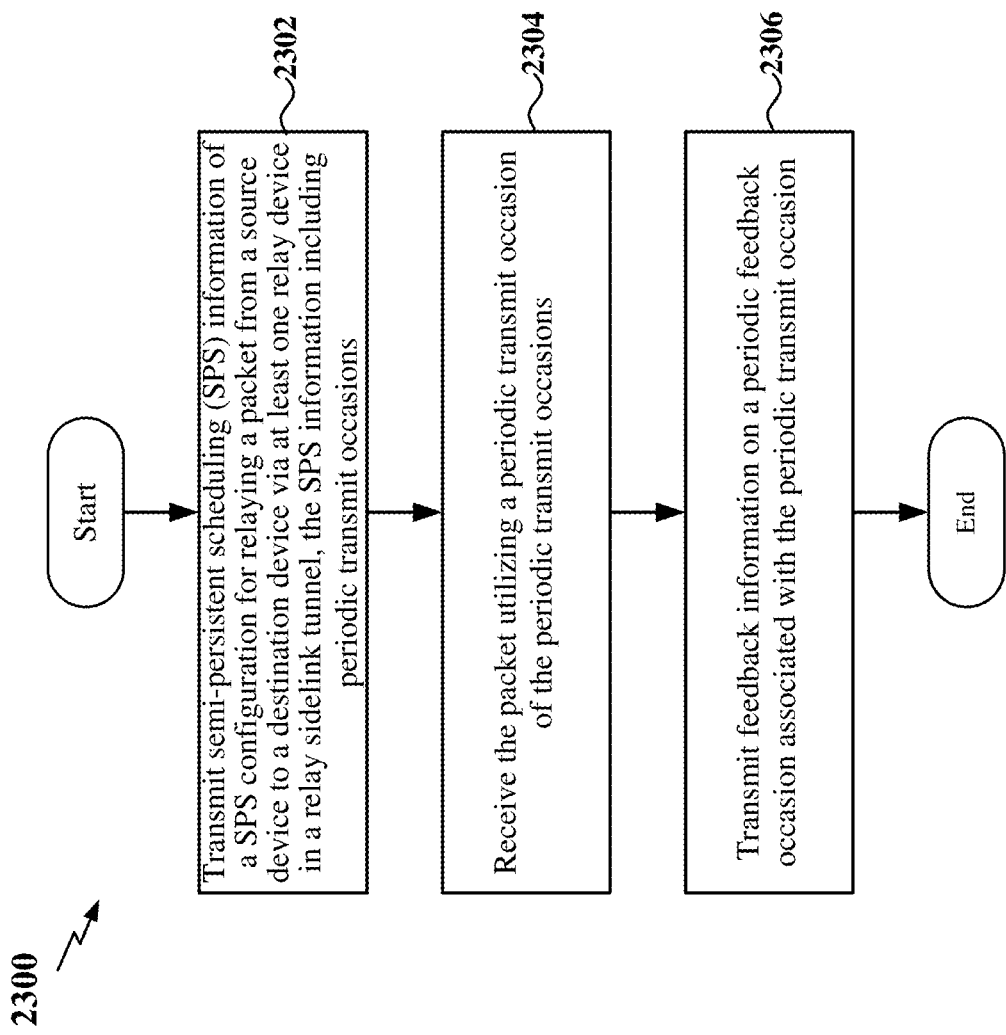

SEMI-PERSISTENT SCHEDULING DESIGNS FOR RELAYING

TECHNICAL FIELD

The technology discussed below relates generally to wireless communication networks, and more particularly, to semi-persistent scheduling designs for relaying communication over sidelink and uplink channels.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may further provide link diversity in various configurations, such as relaying. Relaying in wireless networks seeks to extend base station coverage, improve transmission reliability, and recover failed links due to, for example, blockage or fading. For example, in higher frequency bands, in particular, links can be impaired or blocked for brief periods of time. Facilitating link diversity through the use of relay UEs may improve the user quality of service and overall network reliability.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a wireless communication device in a wireless communication network is disclosed. The method includes identifying semi-persistent scheduling (SPS) information associated with a SPS configuration for relaying a packet from a source device to a destination device via at least one relay device in a relay sidelink tunnel. The SPS information includes periodic transmit occasions for the source device and the at least one relay device. The method further includes transmitting the packet utilizing a periodic transmit occasion of the periodic transmit occasions.

Another example provides a wireless communication device in a wireless communication network. The wireless communication device includes a transceiver, a memory, and a processor coupled to the transceiver and the memory. The processor and the memory are configured to identify semi-persistent scheduling (SPS) information associated with a SPS configuration for relaying a packet from a source device to a destination device via at least one relay device in a relay sidelink tunnel. The SPS information includes periodic transmit occasions for the source device and the at least one relay device. The processor and the memory are further configured to transmit the packet utilizing a periodic transmit occasion of the periodic transmit occasions via the transceiver.

Another example provides a method for wireless communication at a scheduling entity in a wireless communication network. The method includes transmitting, to at least one relay device, semi-persistent scheduling (SPS) information associated with a SPS configuration for relaying a packet from a source device to a destination device via the at least one relay device in a relay sidelink tunnel. The SPS information includes periodic transmit occasions for the source device and the at least one relay device. The method further includes receiving the packet utilizing a periodic transmit occasion of the periodic transmit occasions and transmitting feedback information indicating an acknowledgement or negative acknowledgement of the packet on a periodic feedback occasion associated with the periodic transmit occasion.

Another example provides a scheduling entity in a wireless communication network. The scheduling entity includes a transceiver, a memory, and a processor coupled to the transceiver and the memory. The processor and the memory are configured to transmit, to at least one relay device, semi-persistent scheduling (SPS) information associated with a SPS configuration for relaying a packet from a source device to a destination device via the at least one relay device in a relay sidelink tunnel. The SPS information includes periodic transmit occasions for the source device and the at least one relay device. The processor and the memory are further configured to receive the packet utilizing a periodic transmit occasion of the periodic transmit occasions and transmit feedback information indicating an acknowledgement or negative acknowledgement of the packet on a periodic feedback occasion associated with the periodic transmit occasion.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 23 is a flow chart of an exemplary method for facilitating sidelink relay communication using SPS resources according to some aspects.

DETAILED DESCRIPTION

Figure 1:
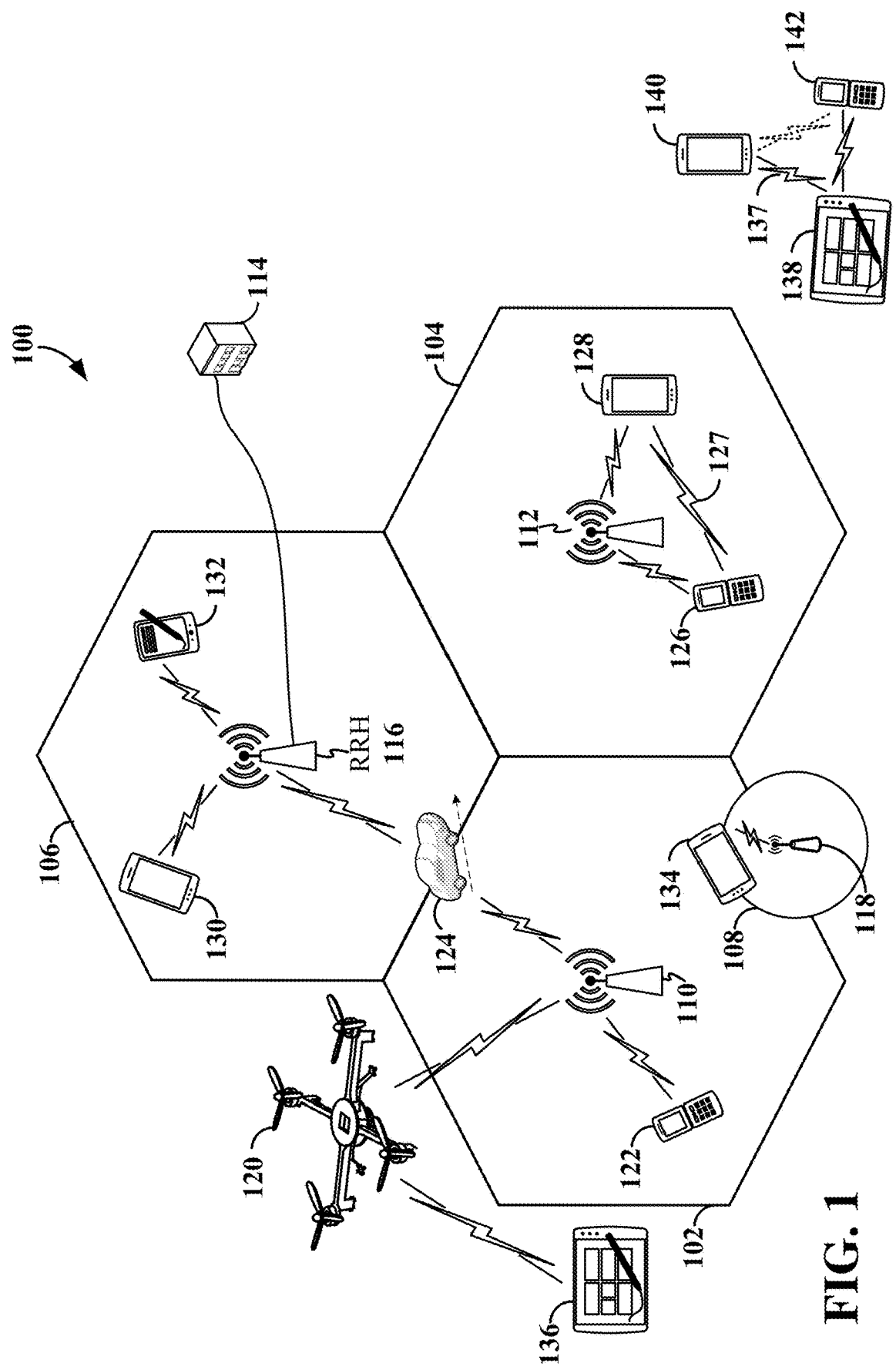
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to semi-persistent scheduling (SPS) designs for relay communication in sidelink networks. A scheduling entity, such as a base station and/or sidelink device, may configure an SPS configuration for relaying a packet from a source device (e.g., a source UE or source sidelink device) to a destination device (e.g., the base station or destination sidelink device) via at least one relay device (e.g., a relay UE or relay sidelink device) in a relay sidelink tunnel. The scheduling entity may transmit SPS information associated with the SPS configuration to the at least one relay device. The SPS information may include, for example, periodic transmit occasions for the source device and the at least one relay device. In some examples, the SPS information may further include a relaying type assigned to each of the at least one relay device for at least one of sidelink relaying or uplink relaying. Relaying types may include, for example, decode and forward (DF), amplify and forward (AF), and compress and forward (CF). The SPS information may be transmitted, for example, via downlink control information (DCI).

In some examples, one or more of the relay devices may forward the SPS information to the source device via a sidelink therebetween. For example, the relay devices may forward the SPS information to the source device in a single frequency network (SFN) manner. In other examples, the source device may be the scheduling entity or the source device may receive the SPS information directly from the scheduling entity.

The source device and the at least one relay device may each transmit the packet utilizing at least one respective periodic transmit occasion of the periodic transmit occasions. For example, the source device may transmit the packet to the at least one relay device and/or the destination device over a sidelink using one or more periodic transmit occasions allocated to the source device. Upon receiving the packet, each of the at least one relay device may then transmit the packet to other relay devices and/or the destination device using respective periodic transmit occasions allocated to the respective relay devices.

In some examples, the destination device is a base station. In this example, the periodic transmit occasions may include periodic sidelink occasions and periodic uplink occasions. In some examples, the base station, as the scheduling entity, may transmit the SPS information indicating the periodic uplink occasions and periodic sidelink occasions to the source device and the at least one relay device. In other examples, the scheduling entity may include the base station and a scheduling sidelink device. In this example, the base station may transmit the periodic uplink occasions and the scheduling sidelink device may transmit the periodic sidelink occasions to the source device and the at least one relay device.

In some examples, the packet may be transmitted utilizing both a periodic uplink occasion (e.g., within a physical uplink shared channel (PUSCH)) and a periodic sidelink occasion (e.g., within a physical sidelink shared channel (PSSCH)). In this example, first feedback information (e.g., an acknowledgement or negative acknowledgement) may be received on a first periodic feedback occasion associated with the periodic uplink occasion and second feedback information may be received on a second periodic feedback occasion associated with the periodic sidelink occasion. In some examples, at least the first feedback information may then be forwarded to the source device. In some examples, a relay device transmitting the packet using the periodic uplink occasion and the periodic sidelink occasion may receive third feedback information from at least one other relay device on a third periodic feedback occasion associated with the periodic uplink occasion. For example, the first feedback information may be received within a physical downlink control channel, the second feedback information may be received within a physical sidelink feedback channel (PSFCH), and the third feedback information may be received within a physical uplink control channel (PUCCH).

In some examples, the relay sidelink tunnel may include one or more hops, each including one or more of the relay devices. In some examples, a plurality of relay devices in a same hop may transmit the packet within a same time slot and on orthogonal or non-orthogonal resources. In some examples, a relay device within a first hop may transmit the packet to a second hop. The packet may be, for example, groupcast to each of the relay devices in the second hop. The relay device in the first hop may further retransmit the packet up to a maximum number of retransmissions utilizing subsequent periodic transmit occasions until a respective acknowledgement is received from all of the relay devices in the second hop. The relay device in the first hop may then deactivate the SPS configuration or utilize the SPS configuration to transmit a new packet. In some examples, feedback information indicating an acknowledgement or negative acknowledgement of the packet may be delayed until after one or more subsequent periodic transmit occasions utilized by other relay devices in the same hop to transmit the packet. In this example, the feedback information may include combined feedback information including respective feedback information for the periodic transmit occasion and each of the subsequent periodic transmit occasions.

In some examples, the periodic transmit occasion is a periodic sidelink transmit occasion. In this example, the packet may be transmitted using a virtual relay identifier (ID) as the destination ID. The virtual relay ID may be associated with each of the relay devices in a hop. The virtual relay ID may further identify a periodic sidelink feedback occasion on which feedback information from each of the relay devices in the hop may be received. In other examples, the packet may be transmitted using a physical relay identifier (ID) of a relay device as the destination ID.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
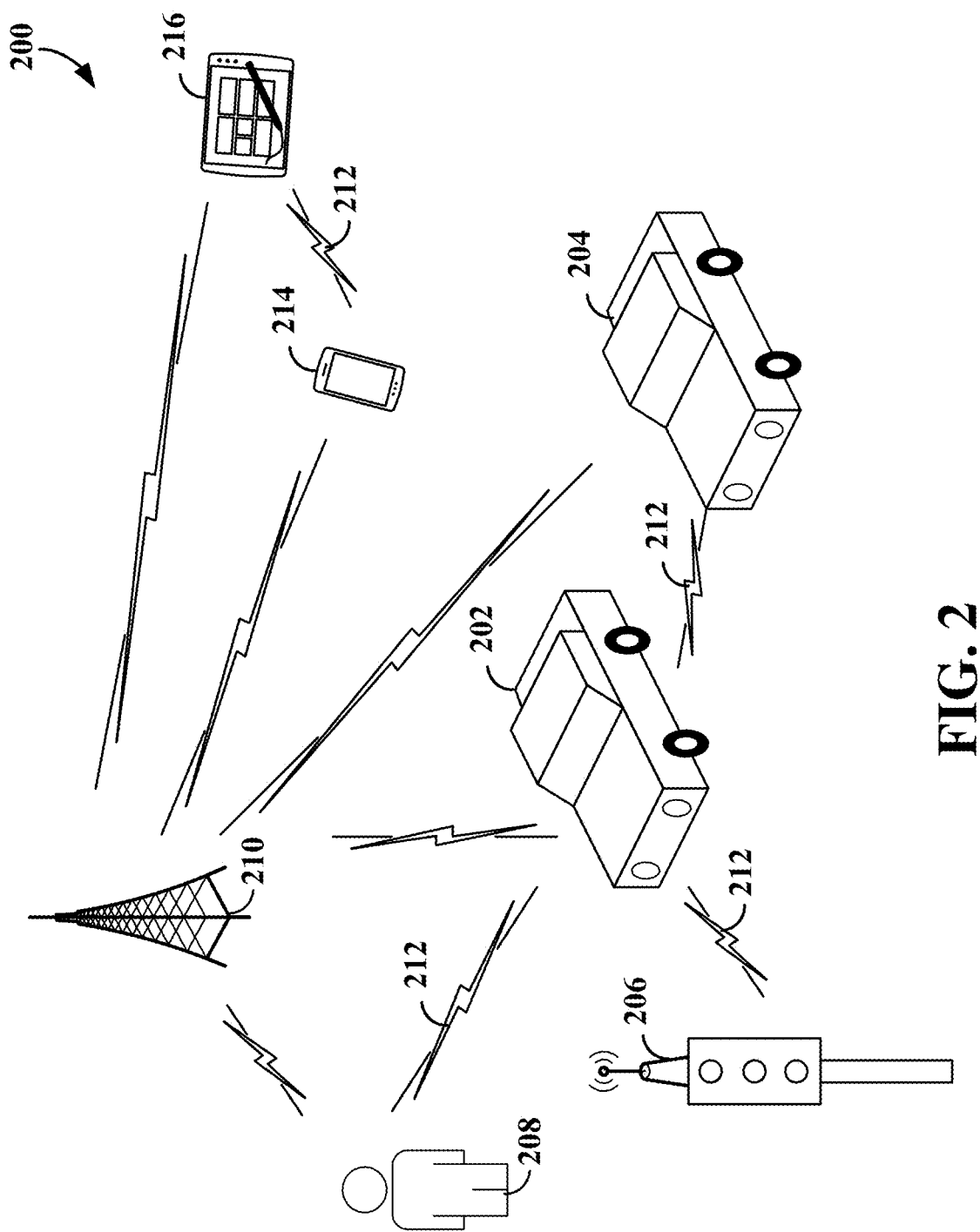
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
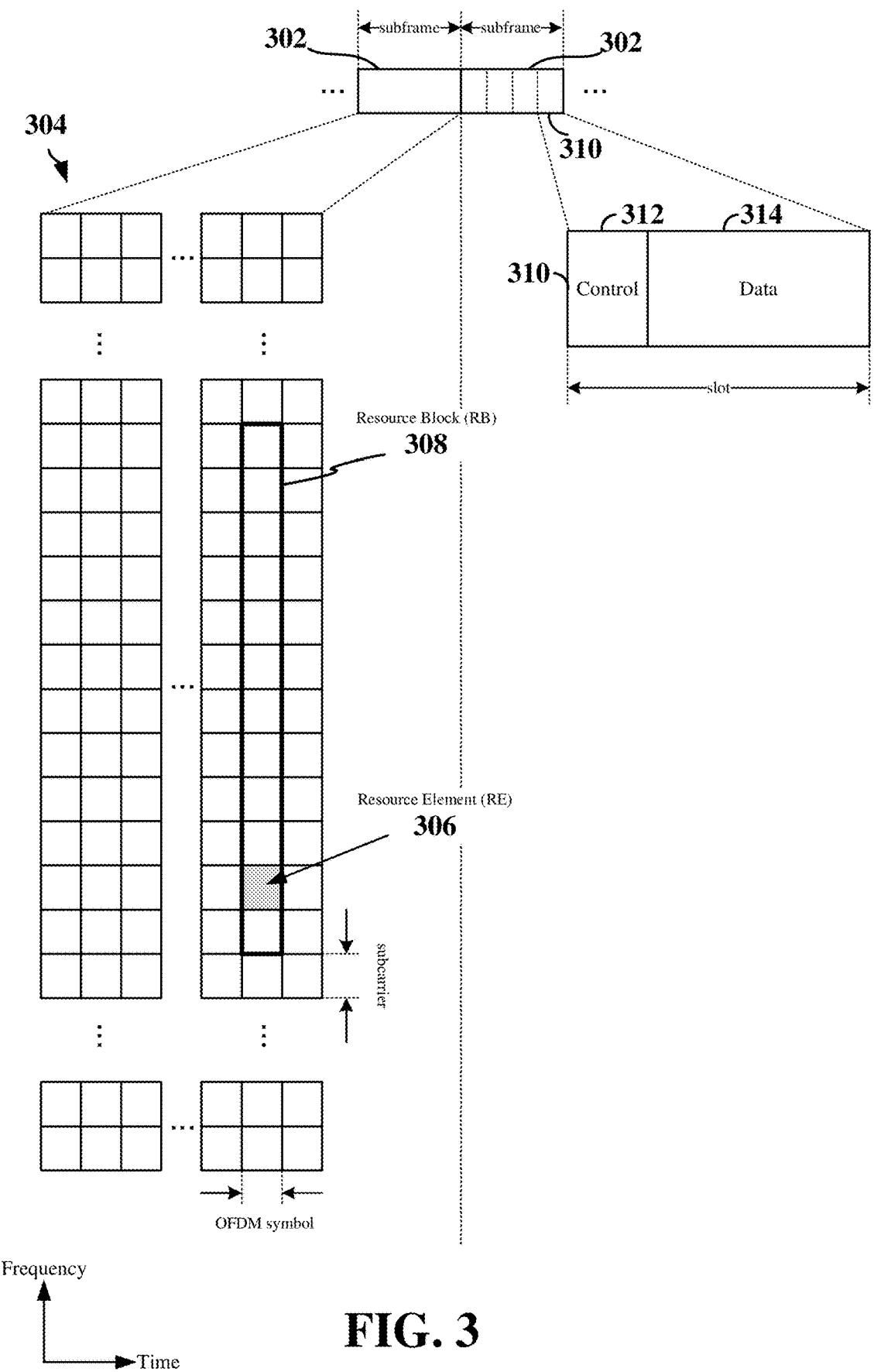
FIG. 3 is a diagram illustrating an example of a frame structure for use in a wireless communication network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In 5G NR (e.g., V2X), sidelink communication may utilize transmission or reception resource pools. For example, the minimum resource allocation unit in frequency may be a sub-channel (e.g., which may include, for example, 10, 15, 20, 25, 50, 75, or 100 consecutive RBs) and the minimum resource allocation unit in time may be one slot. A radio resource control (RRC) configuration of the resource pools may be either pre-configured (e.g., pre-loaded on the UE) or configured by the base station (e.g., gNB).

In addition, there may be two main resource allocation modes of operation for sidelink (e.g., PC5) communications. In a first mode, Mode 1, a radio access network (RAN) node (e.g., gNB) may allocate resources to UEs for sidelink communication between the UEs in various manners. For example, the RAN node may allocate sidelink resources dynamically (e.g., a dynamic grant) to UEs, in response to requests for sidelink resources from the UEs. The RAN node may further activate preconfigured sidelink grants (e.g., configured grants) for sidelink communication among the UEs. In Mode 1, sidelink feedback may be reported back to the RAN node by a transmitting UE.

In a second mode, Mode 2, the UEs may autonomously select sidelink resources for sidelink communication therebetween. In some examples, a transmitting UE may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4A:
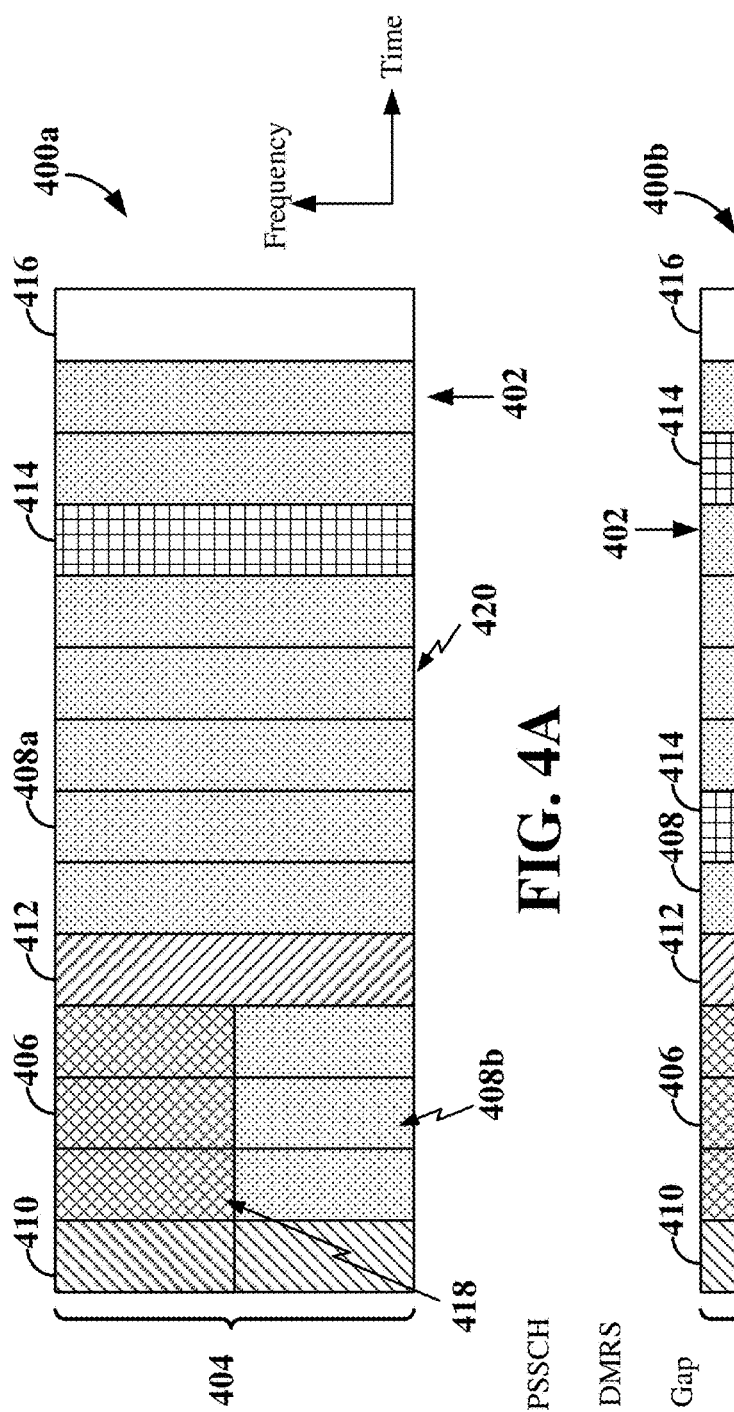
FIGS. 4A and 4B are diagrams illustrating examples of sidelink slot structures according to some aspects.
Figure 4B:
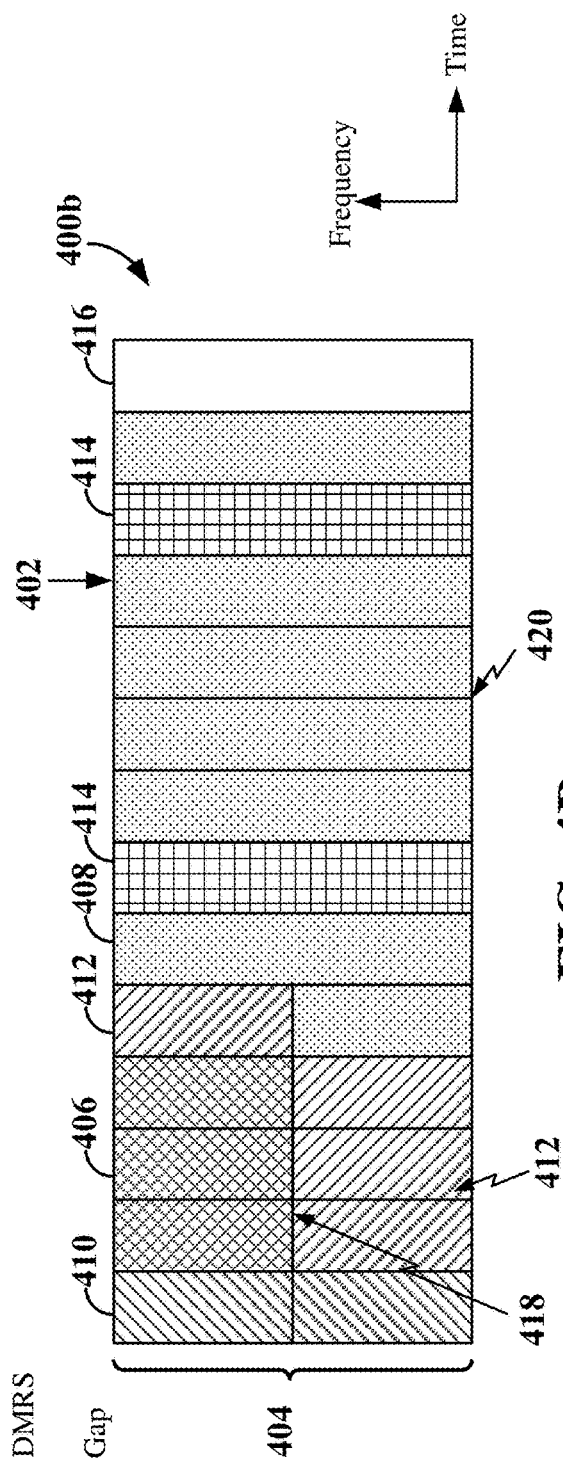

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. For example, the PSCCH 406 may span 10, 12, 14, 20, or 24 PRBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 246-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
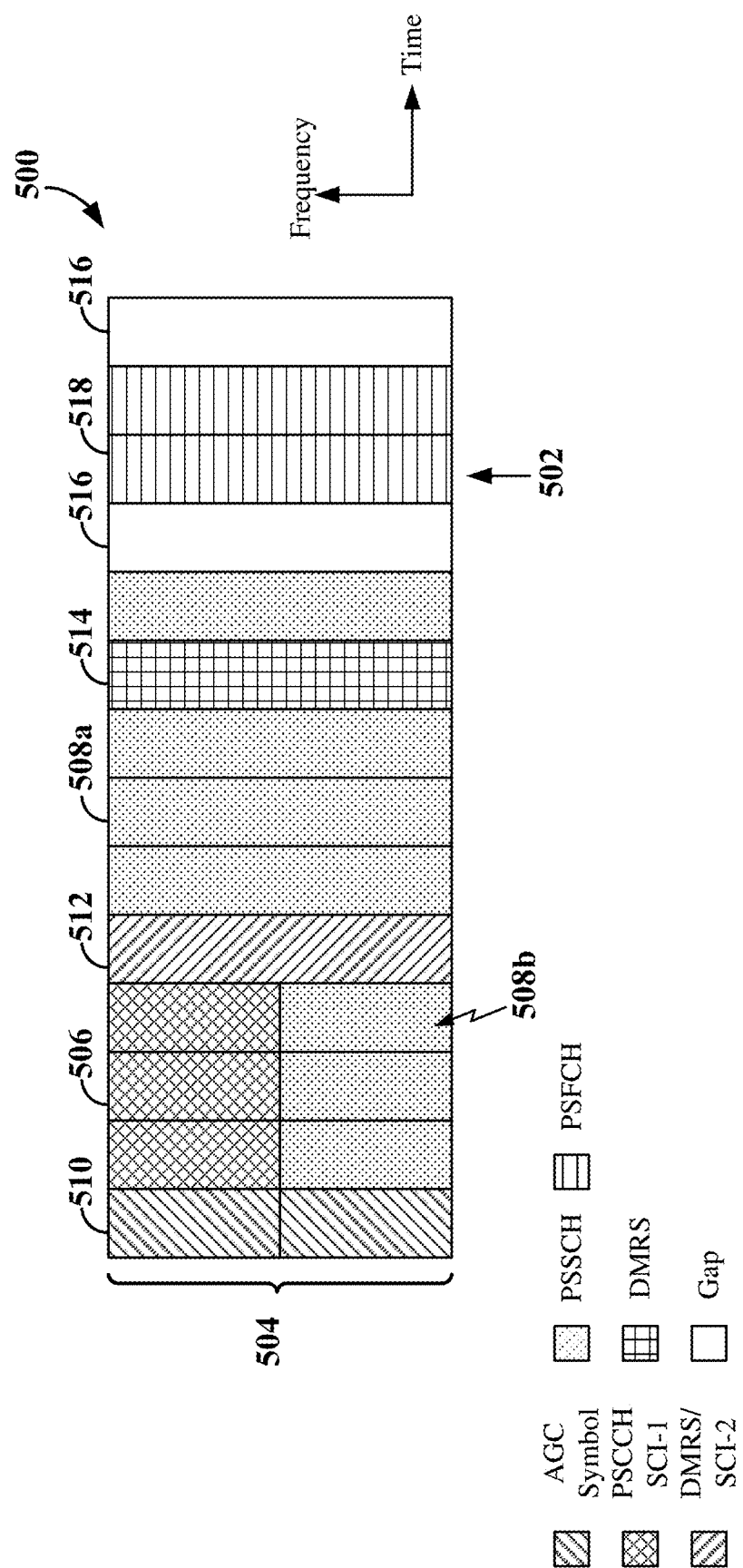
FIG. 5 is a diagram illustrating another example of a sidelink slot structure including feedback information according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500c. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

Figure 6:
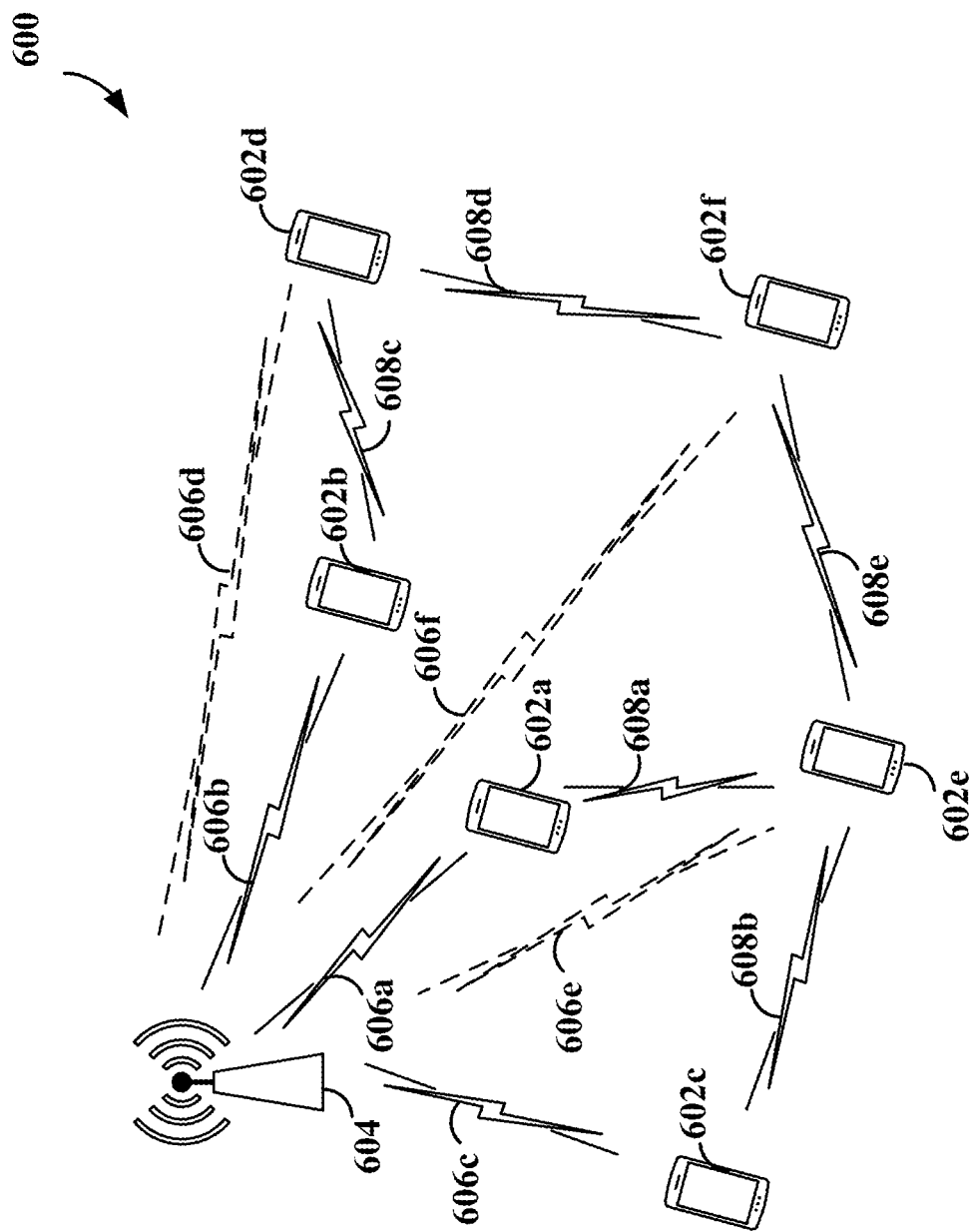
FIG. 6 is a diagram illustrating an example of a wireless communication network employing sidelink relaying according to some aspects.

FIG. 6 is a diagram illustrating an exemplary wireless communication network 600 employing D2D or sidelink relaying. The wireless communication network 600 may correspond, for example, to the RAN 100 illustrated in FIG. 1. The wireless communication network 600 may include a base station (e.g., an eNB or gNB) 604 in wireless communication with one or more wireless communication devices (e.g., UEs) 602a, 602b, 602c, 602d, 602e, and 602f. In the example shown in FIG. 6, the base station 604 may communicate with each of the UEs 602a-602f via a respective Uu wireless communication link 606a-606f. Each of the wireless communication links 606a-606f may utilize a sub-6 GHz carrier frequency or a mmWave carrier frequency. In some examples, one or more UEs (e.g., UEs 602d, 602e, and 602f) may not have a Uu connection with the base station 604.

In addition, respective D2D relay links (sidelinks) 608a-608e may be established between various UEs to enable relaying of information between the base station 604 and a remote UE, such as UE 602f, or between the remote UE 602f and another destination UE (e.g., UE 602c). For example, relay link 608a may be established between UE 602e and UE 602a, relay link 608b may be established between UE 602e and UE 602c, relay link 608c may be established between UE 602d and 602b, relay link 608d may be established between UE 602f and UE 602d, and relay link 608e may be established between UE 602f and UE 602e. Each relay link 608a-608e may utilize decode and forward (DF) relaying, amplify and forward (AF) relaying, or compress and forward (CF) relaying. For DF relaying, HARQ feedback may be provided from the receiving device to the transmitting device. The sidelink communication over the relay links 608a-608e may be carried, for example, in a licensed frequency domain using radio resources operating according to a 6G NR or NR sidelink (SL) specification and/or in an unlicensed frequency domain, using radio resources operating according to 6G new radio-unlicensed (NR-U) specifications.

The relay links 608a-608e may be established due to, for example, distance or signal blocking between the base station 604 (or destination UE) and UE 602f, weak receiving capability of the UE 602f, low transmission power of the UE 602f, limited battery capacity of the UE 602f, and/or to improve link diversity. Thus, the relay links 608a-608e may enable communication between the base station 604 and UE 602f to be relayed via one or more UEs (e.g., UEs 602a-602e) over Uu wireless communication links (e.g., the Uu interface) 606a-606e and relay links (e.g., sidelinks) 608a-608e. In other examples, the relay links 608a-608c may enable sidelink communication to be relayed between UE 602f and another destination UE (e.g., UE 602c) over various relay links.

In some examples, the base station 604 may set-up a relay sidelink tunnel between the base station 604 and the remote UE 602f via relay UEs 602a-602e for relaying of downlink and/or uplink communication between the remote UE 602f and the base station 604. For example, the base station 604 may broadcast or groupcast a tunnel configuration of the relay sidelink tunnel to the remote UE 602f and relay UEs 602a-602e. In examples in which the remote UE 602f and/or one or more relay UEs (e.g., UEs 602d and 602e) lack a Uu link with the base station 604, one or more other relay UEs (e.g., UEs 602a-602c) that receive the tunnel configuration from the base station 604 may forward the tunnel configuration to the remote UE 602f and/or relay UEs 602d and 602e.

The tunnel configuration may indicate, for example, the remote UE 602f, the relay UEs 602a-602e, a number of hops in the tunnel, and other suitable information. For example, the tunnel configuration may include respective identifiers of the remote UE 602f and the relay UEs (e.g., UEs 602a-602c). The tunnel configuration may further indicate whether the remote UE 602f and one or more of the relay UEs has a Uu link to the base station 604. In some examples, one or more of the relay UEs may not have a Uu link with the base station 604. In the example shown in FIG. 6, relay UEs 602d and 602e may or may not have a Uu link with the base station 604. In addition, the remote UE 602f also may or may not have a Uu link with the base station 604. In addition, the tunnel configuration may further indicate whether the remote UE 602f and the relay UEs 602a-602e have respective direct relay links (sidelinks) 608a-608e to one or more neighbor UEs. In some examples, the remote UE 602f and relay UEs 602a-602e may have relay links with only a portion of the UEs in the relay sidelink tunnel. In the example shown in FIG. 6, relay UE 602c may have a Uu link 606c to the base station 604 and a relay link 608b to relay UE 602e, but may not have a relay link to relay UE 602d.

The tunnel configuration may further group the relay UEs into relay UE groups, where each group may communicate with an adjacent group, such that each group may be considered a hop. In the example shown in FIG. 6, for an uplink multi-hop relay sidelink tunnel, a first relay UE group (first hop) may include relay UEs 602d and 602e and a second relay UE group (second hop) may include relay UEs 602a-602c. The tunnel configuration may further indicate that one or more relay UEs have relay links (sidelinks) to other relay UEs regardless of the hop number. For example, relay UEs 602a-602c may belong to the same hop, but may also have relay links to one another for relay communication therebetween. Similarly, relay UEs 602d and 602e may belong to the same hop, but may also have relay links to one another for relay communication therebetween. In addition, each of the relay UEs 602d and 602e in the first hop may further have a respective relay link to each of the relay UEs 602a-602c in the second hop or to only a portion of the relay UEs 602a-602c in the second hop. In some examples, the number of hops may be restricted to one relay UE (e.g., relay UE 602d or 602e). In this example, only one hop (e.g., via relay UE 602d or 602e) may be configured for the relay sidelink tunnel.

In some examples, a common carrier may be shared between the sidelinks 608a-608e and Uu links 606a-606f, such that resources on the common carrier may be allocated for both sidelink communication between wireless communication devices 602a-602f and cellular communication (e.g., uplink and downlink communication) between the wireless communication devices 602a-602f and the base station 604. For example, the wireless communication network 600 may be configured to support a Mode 1 sidelink network in which resources for both sidelink and cellular communication are scheduled by the base station 604. In other examples in which Mode 2 sidelink is implemented on the sidelinks 608a-608e, the wireless communication devices 602a-602f may autonomously select sidelink resources (e.g., from one or more frequency bands or sub-bands designated for sidelink communication) for communication therebetween. In some examples, the remote UE 602f or other scheduling entity (e.g., UE 602a, which is on the last hop closest to the base station 604) may select the sidelink resources for relaying communication between the remote UE 602f and other relay UEs 602a-602e. In examples in which the relay communication is between the remote UE 602f and a destination UE (e.g., UE 602c), the sidelink resources for relaying may be selected by the base station 604 in a Mode 1 configuration or by the remote UE 602f or the destination UE 602c in a Mode 2 configuration.

To facilitate relaying over relay links (sidelinks) and Uu links, resources may be reserved per link (e.g., per Uu link and per relay link). In addition, HARQ feedback may further be supported per link. However, reserving resources per link for each transmission and retransmission of relay communication may increase the signaling overhead in the network. In addition, providing separate HARQ feedback for each link may result in an inefficient usage of resources in the network.

Figure 7:
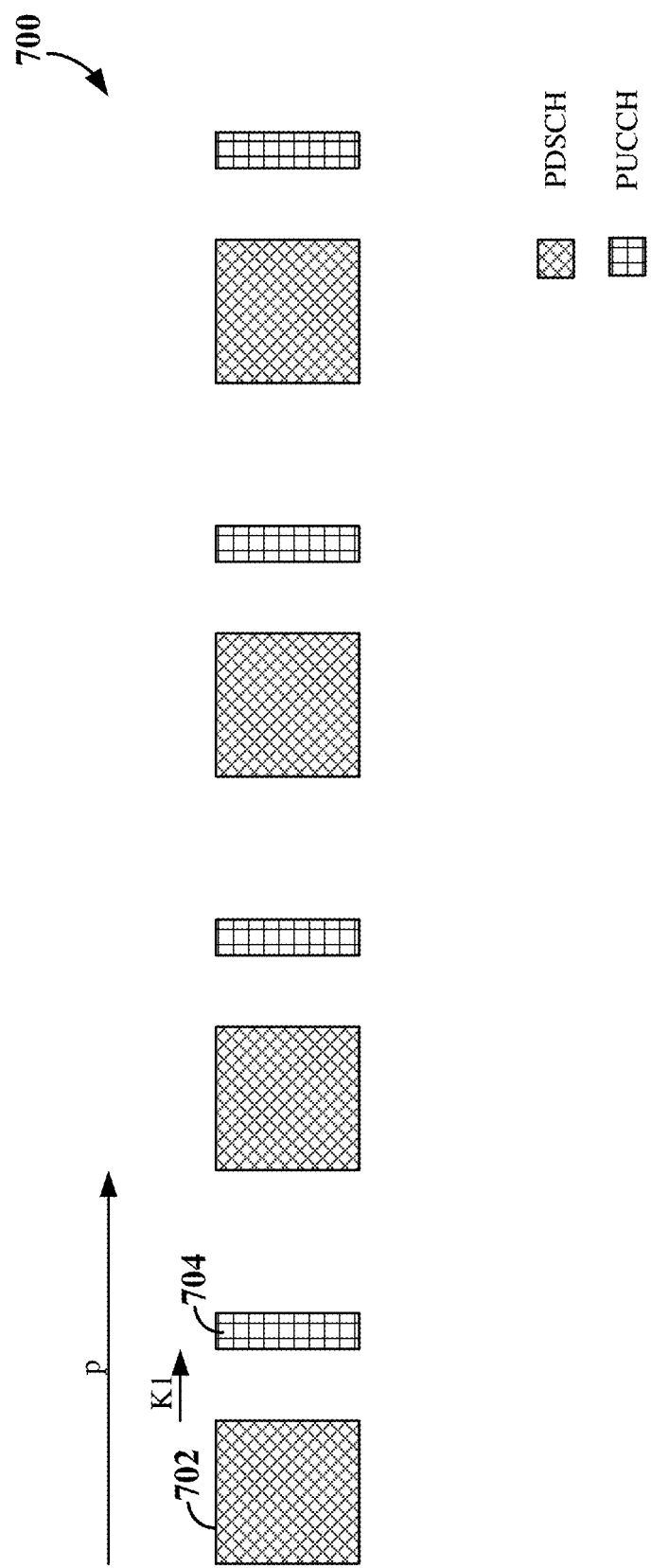
FIG. 7 is a diagram illustrating exemplary semi-persistently scheduled resources according to some aspects.

Therefore, various aspects of the disclosure relate to semi-persistent scheduling (SPS) designs for relay communication. Generally, SPS may be used for periodic communications based on defined settings. For example, an SPS configuration for downlink transmissions may be configured such that a PDSCH communication may be performed periodically with a certain periodicity. FIG. 7 is a diagram 700 illustrating an example of an SPS configuration of downlink transmissions according to some aspects. An SPS configuration may be configured with PDSCH SPS occasions of a periodicity p, which defines the duration of time between two consecutive PDSCH SPS occasions. The SPS configuration may further include a parameter K1, which specifies the PUCCH grant time to send HARQ feedback after receiving the PDSCH. Based on the SPS configuration, a UE may receive a PDSCH during an SPS occasion, and may then transmit feedback information (e.g., HARQ feedback) in a PUCCH, at a time indicated by K1, to indicate whether the PDSCH signal has been received successfully.

On the uplink, an SPS resource may be referred to as a configured grant (CG). With CGs, just as with downlink SPS configurations, scheduling information corresponding to the uplink CG may be signaled just once to the UE. Subsequently, without needing to receive additional scheduling information, the UE may periodically utilize the semi-persistently allocated resources in the uplink CG. For simplicity, uplink CGs and downlink SPS configurations may be referred to herein as SPS configurations.

Figure 8:
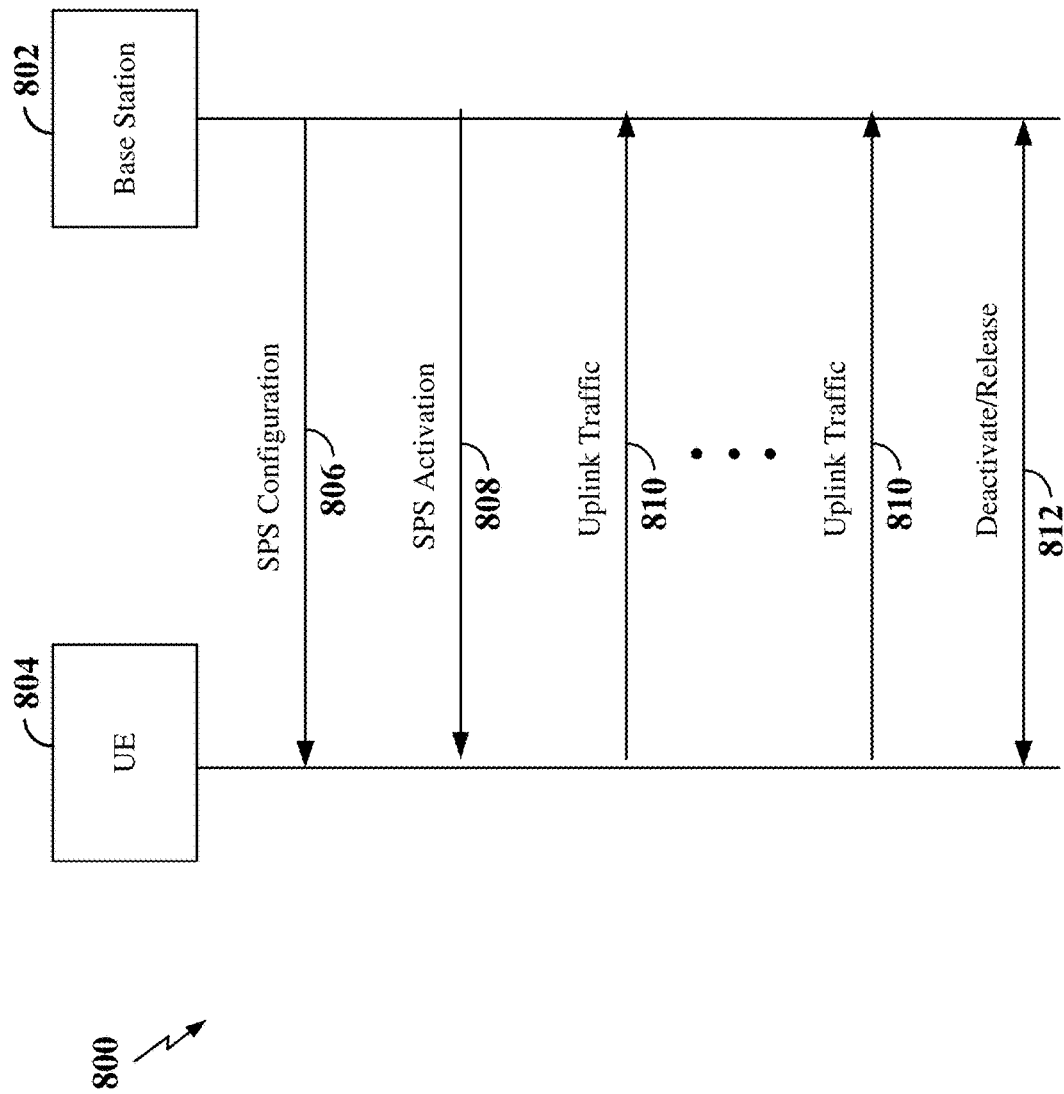
FIG. 8 is a signaling diagram illustrating exemplary signaling for semi-persistent scheduling according to some aspects.

FIG. 8 is a signaling diagram 800 illustrating exemplary signaling for semi-persistent scheduling (SPS) between a base station 802 and a UE 804 according to some aspects of the present disclosure. The base station 802 may be any of the base stations (e.g., gNB, eNB, etc.) or scheduling entities shown in FIGS. 1, 2, and/or 6. The UE 804 may be any of the UEs or scheduled entities shown in FIGS. 1, 2, and/or 6.

At 806, the base station 802 may configure the SPS configuration for the UE 804 and transmit SPS information to the UE 804. The SPS configuration message including the SPS information may be transmitted, for example, via DCI within a PDCCH. The SPS information may include, for example, an indication of the allocated resources for the SPS configuration, a semi-persistent scheduling identifier (e.g., an SPS-RNTI) for the UE 804 and a periodicity (p) of the SPS configuration. Additional SPS information may also include, but are not limited to, an implicit release time, cyclic shift DMRS configuration, modulation and coding scheme (MCS) and/or other parameters. In some examples, the SPS configuration (e.g., the periodicity, SPS-RNTI, etc.) may be configured via a radio resource control (RRC) message and the allocated resources for the SPS configuration may be provided via DCI.

Once configured, in order to begin using the SPS configuration, at 808, the base station 802 may then transmit an SPS activation message scrambled with the SPS-RNTI to the UE 804 to activate the SPS configuration and enable the UE 804 to utilize the SPS configuration based on the SPS information. The SPS activation message may be transmitted, for example, via DCI within a PDCCH. In some examples, the SPS activation message may be transmitted within the same DCI as the SPS information. At 810, the UE 804 may then utilize the assigned uplink resources to periodically transmit uplink traffic to the base station 802 based on the periodicity of the SPS configuration. During periods of silence or when a data transfer is complete, at 812, the SPS configuration may be deactivated/released. For example, an explicit deactivation/release message may be transmitted from the base station 802 to the UE 804. In other examples, the UE 804 may initiate an inactivity timer with the implicit release time received as part of the SPS information, and when the inactivity timer expires, the UE 804 may release the SPS uplink resources.

By implementing SPS configurations per link (Uu and sidelink) for relaying communication, the SPS configurations may be utilized for initial packet transmissions, as well as packet retransmissions, without configuring separate resources for the retransmissions or subsequent initial packet transmissions (for other packets). In addition, the SPS configurations may reduce HARQ feedback on the Uu link. For example, for each Uu link, K1 may be defined to align in time multiple HARQ feedback transmissions. For example, the base station may simultaneously transmit feedback information via a PDCCH to multiple UEs that transmitted the same data (e.g., the data originally transmitted by the remote or source UE). In some examples, this may be configured per hop. In addition, one or more UEs at hop j that are configured to monitor (listen to) Uu relay transmissions from one or more UEs at hop j−1 may simultaneously transmit feedback information to the one or more UEs at hop j−1 via PUCCH transmissions.

Figure 9:
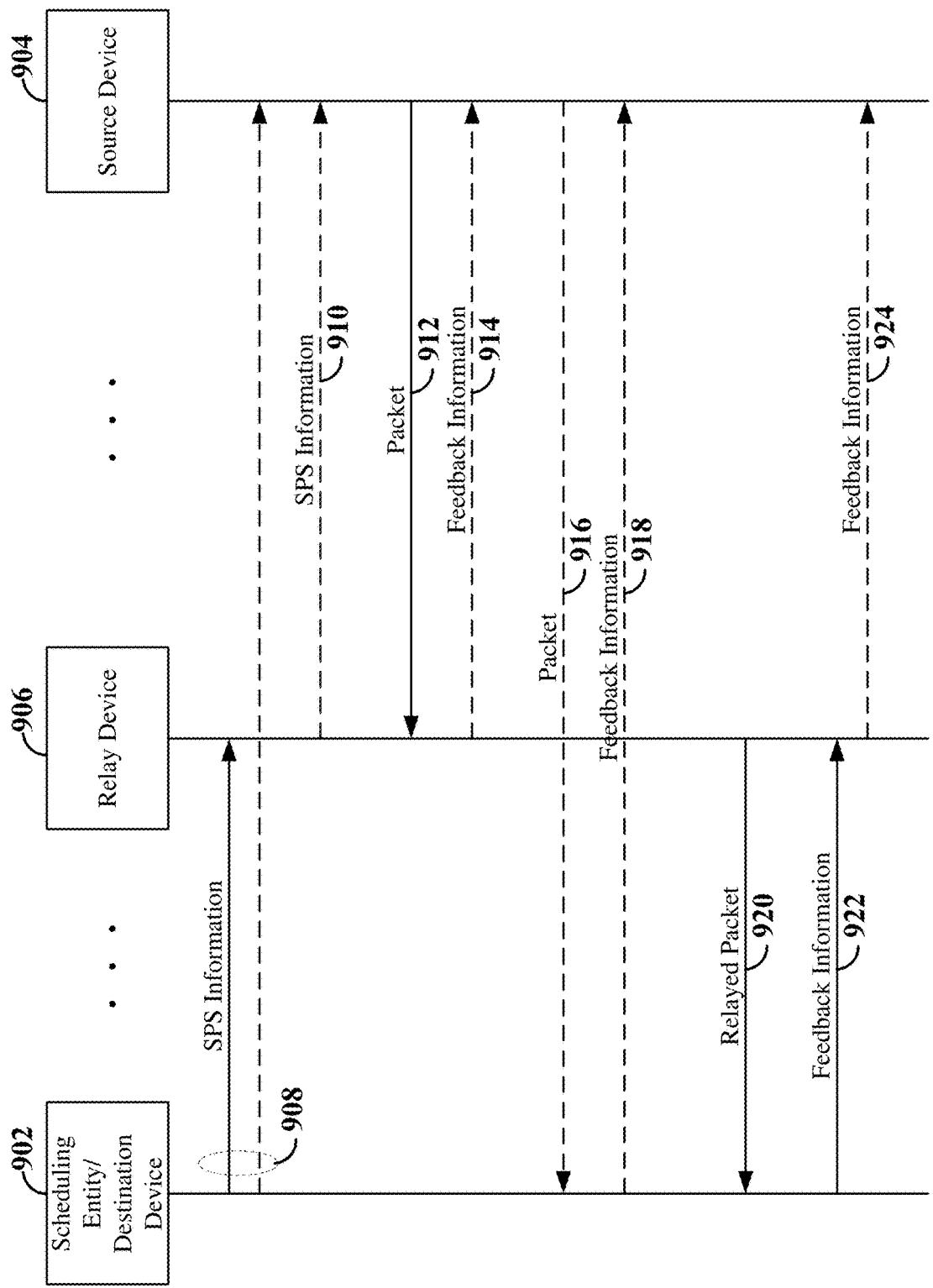
FIG. 9 is a signaling diagram illustrating exemplary signaling for SPS relay communication according to some aspects.

FIG. 9 is a signaling diagram illustrating exemplary signaling for SPS relay communication between a scheduling entity/destination device 902 and a source device 904 via one or more relay devices 906 according to some aspects of the present disclosure. The scheduling entity 902 may be any of the base stations (e.g., gNB, eNB, etc.), UEs (e.g., sidelink devices) or other scheduling entities shown in FIGS. 1, 2, 6, and/or 8. The source device 904 and relay device(s) 906 may be any of the UEs, sidelink devices, or other scheduled entities shown in FIGS. 1, 2, 6, and/or 9.

Although only one relay device 906 is shown in FIG. 9, it should be understood that the SPS relay communication may be relayed through multiple relay devices in one or more hops. The relay device(s) 906 may form a relay (sidelink) tunnel between the source device 904 and the destination device 902. In the example shown in FIG. 9, the scheduling entity is the same as the destination device. For example, the destination device may be a base station and Mode 1 may be utilized for sidelink scheduling. In this example, the base station may schedule the Uu SPS resources and the sidelink SPS resources. In examples in which the destination device is a destination UE (destination sidelink device), the scheduling entity may be the destination sidelink device or the source device 904. In examples in which the destination device is a base station and Mode 2 is utilized for sidelink scheduling, the scheduling entity may include both the base station and either the source device 904 or a scheduling sidelink device (e.g., relay device 906). In this example, the base station may schedule the Uu SPS resources, whereas the source device 904 or relay device 906 may schedule the sidelink SPS resources. Here, the relay device 906 may be at a last hop closest to the base station.

In the example shown in FIG. 9, at 908, the scheduling entity 902 may generate and transmit SPS information associated with an SPS configuration for relay communication. The SPS information may include, for example, an indication of the allocated resources for the source device 904 and the relay device(s) 906 for the SPS configuration and a periodicity (p) of the SPS configuration. For example, the SPS information may indicate periodic transmit occasions for the source device 904 and the relay device(s) 906. Each periodic transmit occasion represents a unit of time, such as one or more symbols, a slot, or one or more slots. In an example, the SPS information may include first periodic transmit occasions on which the source device 904 may transmit and second periodic transmit occasions on which the relay device 906 may transmit. Additional periodic transmit occasions may further be allocated for each additional relay device. In addition, when the destination device

902 is a base station, the periodic transmit occasions may include both periodic uplink occasions and periodic sidelink occasions. Periodic uplink occasions may be allocated to one or more devices that have a Uu link (Uu connection) with the base station 902. For example, periodic uplink occasions may be allocated to relay device 906, and may further be allocated to the source device 904 when the source device 904 has a Uu link with the base station.

Other SPS parameters may further be included in the SPS information, as described above in connection with FIG. 8. In addition, the SPS information may further include a tunnel configuration of the relay tunnel. For example, the tunnel configuration may include respective identifiers (IDs) of the source device 904 and the relay device(s) 906. The tunnel configuration may further indicate whether the source device 904 and one or more of the relay device(s) 906 has a Uu link with the base station/destination device 902. In addition, the tunnel configuration may indicate the relay links between the source device 904 and one or more of the relay device(s) 906, and the relay links between the relay devices 906 themselves. Thus, the tunnel configuration, together with the periodic transmit occasions, may indicate the order of transmissions between the source device 904 and the destination device 902.

The tunnel configuration may further group the relay device(s) 906 into relay device groups, where each group may communicate with an adjacent group, such that each group may be considered a hop. The tunnel configuration may further indicate the communication between hops and between the relay device(s) 906 in the same hop. The tunnel configuration may further indicate the relaying type assigned to each of the relay UEs 906. The relaying type may include, for example, DF, AF, or CF. In some examples, the relaying type may be configured based on the capabilities of the relay device 906. In addition, different relaying types may be configured for different links. For example, the relay device 906 may be configured with relay type AF for sidelink relaying and relay type DF for Uu relaying. As another example, the relay device 906 may be configured with relay type AF for sidelink relaying in the same hop and relay type DF for sidelink relaying between hops.

In examples in which the destination device 902 is a base station, the SPS information, including the tunnel configuration, may be broadcast or groupcast from the scheduling entity 902 within DCI of a PDCCH. In other examples, the tunnel configuration may be broadcast or groupcast separately from the SPS information. In some examples, the SPS configuration (e.g., the periodicity, etc.) may be configured via a radio resource control (RRC) message and the allocated resources (e.g., SPS information) for the SPS configuration may be provided via DCI. In examples in which the scheduling entity is the source device 904, a destination sidelink device 902, or a relay device 906, the SPS information (which may include the tunnel configuration) may be groupcast within SCI-2 of a PSCCH or within a MAC-CE of a PSSCH.

In some examples, the scheduling entity 902 may transmit the SPS information to each of the relay devices 906 and the source device 904. In other examples in which one or more relay devices 906 and/or the source device 904 does not have a link/connection with the scheduling entity (e.g., Uu link in examples in which the scheduling entity is a base station and sidelink in examples in which the scheduling entity is a destination sidelink device or a scheduling relay device), at 910, one or more relay devices 906 may forward the SPS information to other relay devices 906 and/or the source device 904. For example, the SPS information may be forwarded within SCI-2 of a PSCCH or within a MAC-CE of a PSSCH. In some examples, the SPS information may be forwarded to the source device 904 in a single frequency network (SFN) manner. For example, the relay device 906 and one or more additional relay devices may utilize SFN signaling to forward the SPS information to the source device 904.

In some examples, the SPS information may further include the SPS activation message to activate the SPS configuration. In other examples, the SPS activation message may be transmitted separately from the SPS information.

Upon activation of the SPS configuration, at 912, the source device 904 may select a periodic transmit occasion (e.g., a periodic sidelink occasion) and transmit a packet to the relay device(s) 906 to be relayed to the destination device 902 on the selected periodic transmit occasion. The periodic sidelink occasion corresponds to time-frequency resources allocated to the source device for an SPS sidelink transmission (e.g., PSSCH transmission). The packet may include a source ID of the source device and a destination ID associated with one or more relay devices 906, as determined from the SPS information and tunnel configuration. In some examples, the destination ID includes a physical relay ID of a relay device to which the packet is destined. The physical relay ID may be utilized, for example, for asynchronized cooperative relay in which separate periodic transmit occasions are used to unicast the packet to each relay device. In other examples, the destination ID includes a common virtual relay ID for all relay devices in a hop (first hop) to which the packet is destined. The common virtual relay ID may be utilized, for example, for synchronized cooperative relay in which the packet is groupcast to a plurality of relay devices 906. For example, the virtual relay ID may be utilized to groupcast a packet from a relay device in hop j to a plurality of relay devices in hop j+1. In some examples, the physical relay ID or common virtual relay ID may be included within SCI-2. In some examples, the common virtual relay ID may be included in a MAC-CE of the PSSCH carrying the packet.

In examples in which DF is implemented by relay device 906, the relay device 906 may attempt to decode the received packet and, at 914, generate and transmit feedback information (e.g., HARQ ACK/NACK) to the source device 904. The feedback information may be transmitted on a periodic sidelink feedback occasion associated with the selected periodic sidelink occasion. For example, the periodic sidelink feedback occasion may be discerned from the source ID, the destination ID, the starting sub-channel of the PSSCH carrying the packet, and the slot containing the PSSCH. The feedback information may be transmitted within, for example, a PSFCH resource. In examples in which a virtual relay ID is included in the packet, respective feedback information from the relay device 906 and all other relay devices in the same hop (e.g., all relay devices that receive the packet from the source device 904) may be sent in the same PSFCH resource.

If a NACK (negative acknowledgement) is received from one or more relay devices 906 in the first hop, the source device 904 may retransmit the packet on the next (subsequent) periodic sidelink occasion allocated to the source device 904 (e.g., as determined from the periodicity p). If an ACK (acknowledgement) is received from all relay devices in the first hop, the source device 904 may deactivate the SPS configuration or transmit a new packet utilizing the SPS configuration.

In some examples, the source device 904 may retransmit the packet up to a maximum number of times (X), where X may be Uu or sidelink RRC/MAC-CE configured. Once the maximum number of retransmissions (X) is reached, the source device 904 may deactivate the SPS configuration or transmit a new packet utilizing the SPS configuration.

In examples in which the source device 904 has a link (e.g., Uu or sidelink) with the destination device 902, at 916, the source device 904 may further transmit the packet directly to the destination device 902. In examples in which the destination device is a destination sidelink device, the packet may be transmitted on the same selected periodic sidelink occasion for the relay device(s) 906. In this example, the packet may be groupcast to one or more relay devices 906 and the destination device 902. In other examples, the source device 904 may select another periodic transmit occasion (periodic uplink occasion or periodic sidelink occasion) allocated to the source device 904 for transmission of the packet to the destination device.

At 918, the destination device 902 may then transmit feedback information (e.g., HARQ ACK/NACK) to the source device 904. If a NACK is received from the destination device 902, the source device 904 may retransmit the packet on the next (subsequent) periodic sidelink occasion allocated to the source device 904 for SPS transmissions to the destination device (e.g., as determined from the periodicity p). The number of retransmissions may be limited by the maximum number of retransmissions X. If an ACK (acknowledgement) is received from all relay devices in the first hop, the source device 904 may deactivate the SPS configuration or transmit a new packet utilizing the SPS configuration.

At 920, the relay device 906 may select a periodic transmit occasion (e.g., periodic sidelink occasion or periodic uplink occasion) to forward (relay) the packet to the destination device 902. The periodic transmit occasion corresponds to time-frequency resources allocated to the relay device 906 for an SPS transmission (e.g., PSSCH or PUSCH transmission). In some examples, the packet may be unicast from the relay device 906 to the destination device 902. In other examples, the packet may be groupcast from the relay device 906 to the destination device 902 and one or more other relay devices. At 922, the destination device 902 may generate and transmit feedback information (e.g., HARQ ACK/NACK) to the relay device 904. The feedback information may be transmitted on a periodic feedback occasion associated with the selected periodic transmit occasion. For example, the feedback information may be carried on a PSFCH or a PDCCH. In examples in which the destination device 902 is a base station, the PDCCH resource may be discerned from K1, as indicated in the SPS configuration. If a NACK (negative acknowledgement) is received from the destination device 902, the relay device 906 may retransmit the packet on the next (subsequent) periodic transmit occasion allocated to the relay device 906 (e.g., as determined from the periodicity p). If an ACK (acknowledgement) is received from the destination device 902, the relay device 906 may cancel subsequent SPS relay transmissions. In addition, in some examples, at 924, the relay device 906 may forward the feedback information received from the destination device 902 to the source device 904. If the feedback information from the destination device 902 and forwarded to the source device 904 is an ACK, the source device 904 may either deactivate the SPS configuration or utilize the SPS configuration to transmit a new packet.

In some examples, there may be multiple hops in the relay tunnel. For example, the relay device 906 may further forward (relay) the packet to one or more additional relay devices in a second hop (not shown). Each of the additional relay devices in the second hop may then forward (relay) the packet to the destination device 902 and/or to further relay devices in yet a third hop. In some examples, the relay device 906 may not have a Uu link or sidelink with the destination device 902. In this example, the packet may be relayed to the destination device 902 by one or more additional relay devices in subsequent hops (e.g., second, third, etc.).

Figure 10:
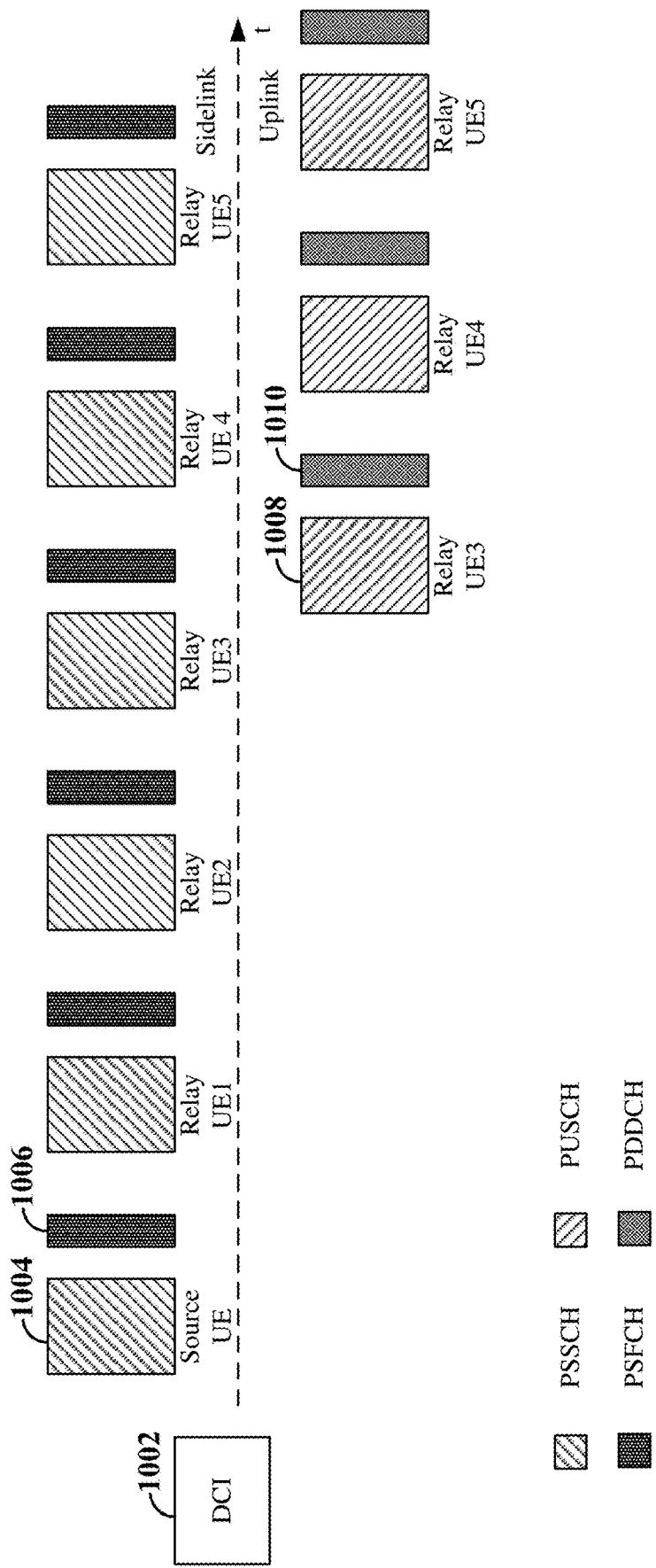
FIG. 10 is a diagram illustrating exemplary scheduled SPS resources for relay communication according to some aspects.

FIG. 10 is a diagram illustrating exemplary scheduled SPS resources for relay communication according to some aspects. The scheduled SPS resources may include both sidelink SPS resources and uplink SPS resources. The sidelink and uplink SPS resources may be scheduled, for example, in DCI 1002 containing the SPS information associated with an SPS configuration for a relay tunnel between a source device (source UE) and a destination device (e.g., a base station). For ease of explanation, the relay tunnel may correspond, for example, to the relay tunnel shown in FIG. 6. However, it should be understood that other configurations of a relay tunnel including one or more hops and including a different destination device (e.g., a destination sidelink device) may be utilized with aspects of the present disclosure.

As in FIG. 6, there are five relay UEs (relay UE1, relay UE2, relay UE3, relay UE4, and relay UE5) and two hops in FIG. 10. A first hop may include relay UE1 and relay UE2 (e.g., which may correspond to UEs 602d and 602e). A second hop may include relay UE3, relay UE4, and relay UE5 (e.g., which may correspond to relay UEs 602a-602c). In the example shown in FIG. 10, the source UE (e.g., UE 602f shown in FIG. 6) and first hop (e.g., relay UEs 1 and 2) may not have a Uu connection to the base station. The SPS information may indicate periodic sidelink occasions 1004 for the source UE and one or more relay UEs (e.g., relay UE1-relay UE5). The SPS information may further indicate periodic uplink occasions 1008 for at least one or more of the relay UEs (e.g., relay UE3-relay UE5 in the second hop). The periodic sidelink occasions 1004 may be utilized for PSSCH transmissions, while the periodic uplink occasions 1008 may be utilized for PUSCH transmissions.

The SPS information may further indicate periodic feedback occasions (e.g., periodic sidelink feedback occasions 1006 and periodic downlink feedback occasions 1010) for each of the periodic sidelink occasions 1004 and periodic uplink occasions 1008, respectively. The periodic sidelink feedback occasions 1006 may be indicated by the subchannel and time slot within which a packet is transmitted (or relayed), as described above. In addition, the periodic downlink feedback occasions 1010 may be indicated by K1 configured for the SPS configuration. The periodic sidelink feedback occasions may be utilized for PSFCH transmissions, while the periodic downlink feedback occasions may be utilized for PDCCH transmissions.

The periodic sidelink occasions 1004 and periodic uplink occasions 1008 for the source UE and relay UEs are scheduled in time based on the order of transmission. In the example shown in FIG. 10, the source UE may transmit a packet in a PSCCH on aperiodic sidelink occasion 1004 allocated to the source UE. The packet may be transmitted in a synchronized cooperative relay manner in which the packet is groupcast to relay UE1 and relay UE2 using a common virtual relay ID for the packet. Based on the sub-channel and slot of the periodic sidelink occasion 1004, along with the source ID of the source UE and common virtual relay ID as the destination ID, each of relay UE1 and relay UE2 may identify the periodic sidelink feedback occasion 1006 on which to transmit feedback information (HARQ ACK/NACK) in a PSFCH to the source UE. Thus, each of relay UE1 and relay UE2 may transmit respective feedback information to the source UE on the same periodic sidelink feedback occasion 1006.

If relay UE1 and relay UE2 successfully decoded the packet (and transmitted an ACK to the source UE), the relay UE1 and relay UE2 may each forward (relay) the same packet (e.g., the same transport block) in PSSCHs on respective periodic sidelink occasions 1004 allocated to the relay UE1 and relay UE2. Again, the packet may be transmitted by relay UE1 and relay UE2 in a synchronized cooperative relay manner in which the packet is groupcast by each of relay UE1 and relay UE2 to relay UEs in the next hop (e.g., relay UE3, relay UE4 and relay UE5) using a common virtual relay ID for the packet. In some examples, relay UE1 and relay UE2 may further groupcast the packet to relay UEs in the same hop. For example, relay UE1 may further groupcast the packet to UE2, and vice-versa. Based on the sub-channel and slot of the respective periodic sidelink occasions 1004 utilized by relay UE1 and relay UE2, along with the source ID of the source UE and the common virtual relay ID as the destination ID, each of relay UE3, relay UE4, and relay UE5 (and relay UE1/UE2 for same hop relaying) may identify the respective periodic sidelink feedback occasion 1006 on which to transmit feedback information (HARQ ACK/NACK) in respective PSFCHs to relay UE1 and relay UE2. Thus, each of relay UE3, relay UE4, and relay UE5 (and relay UE1 or UE2 for same hop relaying) may transmit respective feedback information to relay UE1 on the same periodic sidelink feedback occasion 1006 associated with relay UE1's periodic sidelink occasion and respective feedback information to relay UE2 on the same periodic sidelink feedback occasion 1006 associated with relay UE2's periodic sidelink occasion.

If relay UE3, relay UE4, and relay UE5 successfully decoded the packet (and transmitted a respective ACK to relay UE1 and relay UE2), each of the relay UE3, relay UE4, and relay UE5 may forward (relay) the same packet to the base station in PUSCHs on respective periodic uplink occasions 1008 allocated to the relay UE3, relay UE4, and relay UE5. The base station may transmit respective feedback information (HARQ ACK/NACK) to each of relay UE3, relay UE4, and relay UE5 in PDCCHs on respective periodic downlink feedback occasions 1010. Each periodic downlink feedback occasion 1010 may be based on a respective K1 associated with the periodic uplink occasions allocated to each of relay UE3, relay UE4, and relay UE5. Thus, the base station may transmit feedback information to relay UE3 in a PDCCH on the periodic downlink occasion associated with relay UE3's periodic uplink occasion. The base station may further transmit feedback information to relay UE4 in a PDCCH on the periodic downlink occasion associated with relay UE4's periodic uplink occasion. In addition, the base station may transmit feedback information to relay UE5 in a PDCCH on the periodic downlink occasion associated with relay UE5's periodic uplink occasion. In some examples, one or more of the relay UE3, relay UE4, or relay UE5 may forward the feedback information received from the base station to the source UE. For example, the feedback information from the base station may be forwarded via a PSSCH or MAC-CE to the source UE via one or more of relay UE1 or relay UE2.

Each of relay UE3, relay UE4, and relay UE5 may further be allocated periodic sidelink occasions 1004 on which to forward (relay) the same packet in respective PSSCHs over the sidelink. In some examples, relay UE3, relay UE4, and relay UE5 may form a second hop, and may groupcast the packet to the other relay devices in the second hop. For example, relay UE3 may groupcast the packet to relay UE4 and relay UE5. Similarly, relay UE4 may groupcast the packet to relay UE3 and relay UE5, and relay UE5 may groupcast the packet to relay UE3 and relay UE4. In some examples, relay UE3, relay UE4, and relay UE5 may further groupcast the packet to relay UEs in other hops. For example, the packet may be further groupcast to relay UE1 and relay UE2. Relaying of the packet over multiple periodic sidelink occasions 1004 may facilitate decoding of the packet at each of the relay UEs. Each of relay UE3, relay UE4, and relay UE5 (and relay UE1/UE2 for prior hop relaying) may further identify the respective periodic sidelink feedback occasion 1006 on which to transmit feedback information (HARQ ACK/NACK) in respective PSFCHs to relay UE3, relay UE4, and relay UE5.

Each of the relay UEs (relay UE1-relay UE5) in the example shown in FIG. 10 is implementing DF. In other examples, one or more of the relay UEs may implement AF or CF. With AF and CF, feedback information may not be transmitted, and as such, the periodic sidelink feedback occasions 1106 may not be utilized. In addition, although the periodic sidelink occasions 1004 are described as facilitating groupcast transmissions, in other examples, the packet may be unicast on the sidelink from one UE to another UE. In this example, additional periodic sidelink occasions may be allocated to allow the packet to be transmitted from one UE to multiple other UEs.

Figure 11:
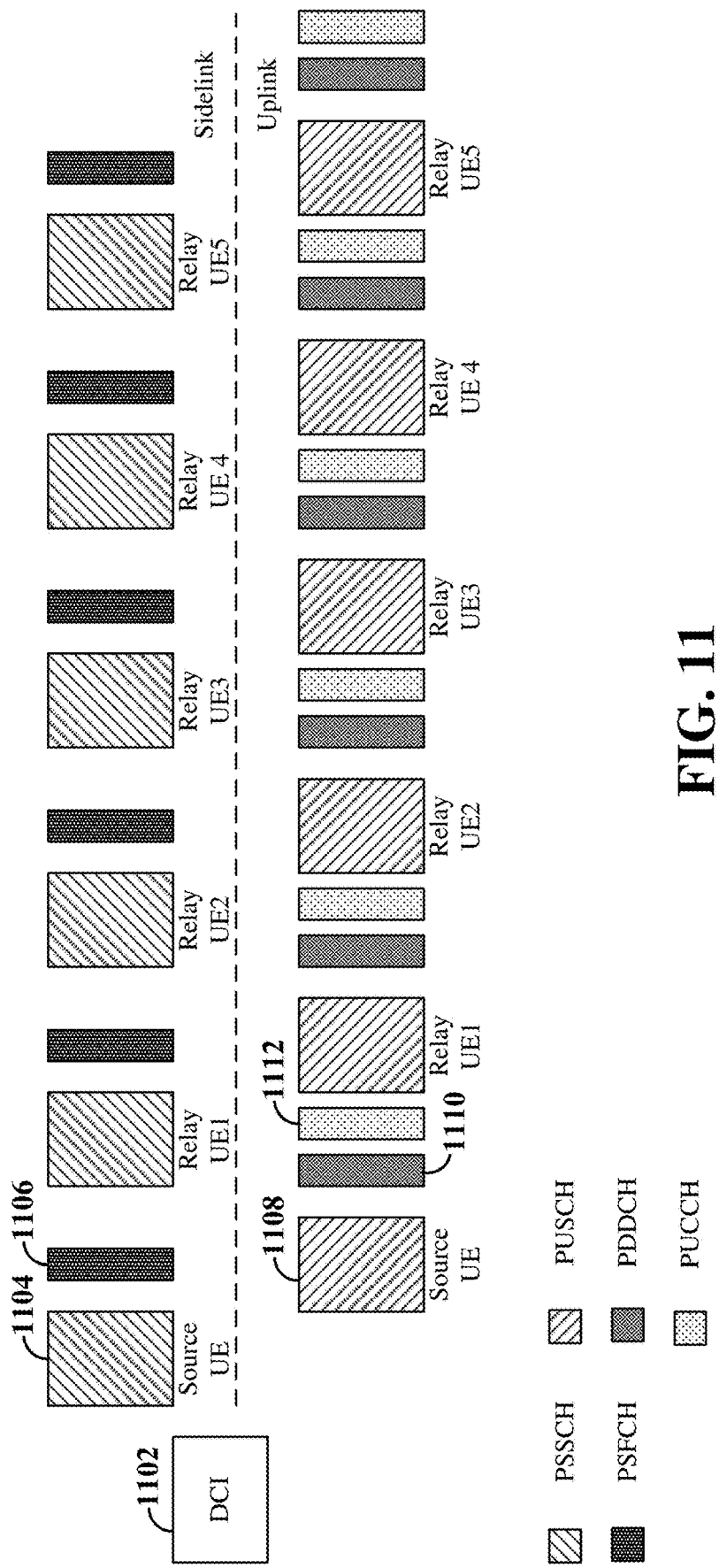
FIG. 11 is a diagram illustrating other exemplary scheduled SPS resources for relay communication according to some aspects.

FIG. 11 is a diagram illustrating other exemplary scheduled SPS resources for relay communication according to some aspects. The scheduled SPS resources may include both sidelink SPS resources and uplink SPS resources. As in the example shown in FIG. 10, the sidelink and uplink SPS resources may be scheduled, for example, in DCI 1102 containing the SPS information associated with an SPS configuration for a relay tunnel between a source device (source UE) and a destination device (e.g., a base station). Again, for ease of explanation, the relay tunnel may correspond, for example, to the relay tunnel shown in FIG. 6. However, it should be understood that other configurations of a relay tunnel including one or more hops and including a different destination device (e.g., a destination sidelink device) may be utilized with aspects of the present disclosure.

As in FIG. 6, there may be five relay UEs (relay UE1, relay UE2, relay UE3, relay UE4, and relay UE5) and two hops. A first hop may include relay UE1 and relay UE2 (e.g., which may correspond to UEs 602*d* and 602*e*). A second hop may include relay UE3, relay UE4, and relay UE5 (e.g., which may correspond to relay UEs 602*a*-602*c*). In the example shown in FIG. 11, the SPS information may indicate periodic sidelink occasions 1104 for the source UE (e.g., UE 602*f* shown in FIG. 6) and one or more relay UEs (e.g., relay UE1-relay UE5). The SPS information may further indicate periodic uplink occasions 1108 for the source UE and one or more of the relay UEs (e.g., relay UE1-relay UE5). In the example shown in FIG. 11, the source UE and each of the relay UEs (relay UE1-relay UE5) each have a Uu connection to the base station. The periodic sidelink occasions 1104 may be utilized for PSSCH transmissions, while the periodic uplink occasions 1108 may be utilized for PUSCH transmissions.

The SPS information may further indicate periodic feedback occasions 1106 and 1110 for each of the periodic sidelink occasions 1104 and periodic uplink occasions 1108, respectively. The periodic sidelink feedback occasions 1106 may be utilized for PSFCH transmissions, while the periodic downlink feedback occasions 1110 may be utilized for PDCCH transmissions. In the example shown in FIG. 11, the SPS information may further indicate periodic uplink feedback occasions 1112 associated with the periodic uplink occasions 1108. In some examples, relay UEs may be configured to monitor the Uu link during the periodic uplink occasions 1008 of relay UEs in the same or different hops and provide feedback information to relay UEs in PUCCH transmissions via the periodic uplink feedback occasions 1112. Thus, the periodic uplink feedback occasions 1112 may be utilized for PUCCH transmissions.

As in FIG. 10, the periodic sidelink occasions 1104 and periodic uplink occasions 1108 for the source UE and relay UEs are scheduled in time based on the order of transmission. For example, the source UE may transmit a packet on a first periodic sidelink occasion 1104 allocated to the source UE. The packet may be groupcast, for example, to relay UE1 and relay UE2 using a common virtual relay ID for the packet. Each of relay UE1 and relay UE2 may then identify the periodic sidelink feedback occasion 1106 on which to transmit feedback information (HARQ ACK/NACK) to the source UE and transmit respective feedback information to the source UE on the same periodic sidelink feedback occasion 1106.

Relay UE1 and relay UE2 may each forward (relay) the same packet on respective periodic sidelink occasions 1104 allocated to the relay UE1 and relay UE2. The packet may be groupcast, for example, by each of relay UE1 and relay UE2 to relay UEs in the next hop (e.g., relay UE3, relay UE4 and relay UE5) using a common virtual relay ID for the packet. In some examples, relay UE1 and relay UE2 may further groupcast the packet to relay UEs in the same hop. Each of relay UE3, relay UE4, and relay UE5 (and relay UE1/UE2 for same hop relaying) may identify the respective periodic sidelink feedback occasion 1106 on which to transmit feedback information (HARQ ACK/NACK) to relay UE1 and relay UE2. Thus, each of relay UE3, relay UE4, and relay UE5 (and relay UE1 or UE2 for same hop relaying) may transmit respective feedback information to relay UE1 on the same periodic sidelink feedback occasion 1106 associated with relay UE1's periodic sidelink occasion and respective feedback information to relay UE2 on the same periodic sidelink feedback occasion 1106 associated with relay UE2's periodic sidelink occasion.

Relay UE3, relay UE4, and relay UE5 may each forward (relay) the same packet on respective periodic sidelink occasions 1104 allocated to relay UE3, relay UE4, and relay UE5. In some examples, relay UE3, relay UE4, and relay UE5 may form a second hop, and may groupcast the packet to the other relay devices in the second hop. For example, relay UE3 may groupcast the packet to relay UE4 and relay UE5. Similarly, relay UE4 may groupcast the packet to relay UE3 and relay UE5, and relay UE5 may groupcast the packet to relay UE3 and relay UE4. In some examples, relay UE3, relay UE4, and relay UE5 may further groupcast the packet to relay UEs in other hops. For example, the packet may be further groupcast to relay UE1 and relay UE2. Each of relay UE3, relay UE4, and relay UE5 (and relay UE1/UE2 for prior hop relaying) may further identify the respective periodic sidelink feedback occasion 1106 on which to transmit feedback information (HARQ ACK/NACK) in respective PSFCHs to relay UE3, relay UE4, and relay UE5.

The source UE and each of the relay UEs (e.g., relay UE1-relay UE5) may further forward (relay) the packet to the base station on respective periodic uplink occasions 1108 allocated to the UEs. The base station may transmit respective feedback information (HARQ ACK/NACK) to each of the UEs (source UE and relay UEs) in PDCCHs on respective periodic downlink feedback occasions 1110.

In addition, as shown in FIG. 11, the relay UEs may each further be configured to monitor the periodic uplink transmit occasions 1108 allocated to the source UE and other relay UEs. For example, relay UE1 and relay UE2 may be configured to monitor the PUSCH transmission of the source UE on the periodic uplink occasion 1108 allocated to the source UE. Relay UE1 and relay UE2 may then be configured to provide feedback information (HARQ ACK/NACK) to the source UE in a same PUCCH on a periodic uplink feedback occasion 1112 associated with the periodic uplink occasion 1108 of the source UE. Similarly, relay UE1 and relay UE2 may each be configured to monitor the PUSCH transmissions of each other on the periodic uplink occasions 1108 allocated to relay UE1 and relay UE2 and to provide feedback information (HARQ ACK/NACK) to each other in respective PUCCH transmissions on respective periodic uplink feedback occasions 1112 associated with the periodic uplink occasions 1108 allocated to relay UE1 and relay UE2. In some examples, relay UEs in other hops (e.g., relay UE3, relay UE4, and relay UE5) may also be configured to monitor the uplink transmissions of relay UE1 and relay UE2 and to provide feedback information (HARQ ACK/NACK) to relay UE1 and relay UE2 on the periodic uplink feedback occasions 1112 for relay UE1 and relay UE2. Relay UE3, relay UE4, and relay UE5 (and optionally relay UE1 and relay UE2) may also further be configured to monitor the PUSCH transmissions of relay UE3, relay UE4, and relay UE5 on the periodic uplink occasions 1108 allocated to relay UE3, relay UE4, and relay UE5 and to provide feedback information (HARQ ACK/NACK) to each other on the respective periodic uplink feedback occasions 1112 associated with the periodic uplink occasions 1108 of relay UE3, relay UE4, and relay UE5. For example, relay UE4, relay UE5 (and optionally relay UE1 and relay UE2) may provide feedback information (HARQ ACK/NACK) on the same periodic uplink feedback occasion 1112 associated with the periodic uplink occasion 1108 allocated to relay UE3.

Figure 12:
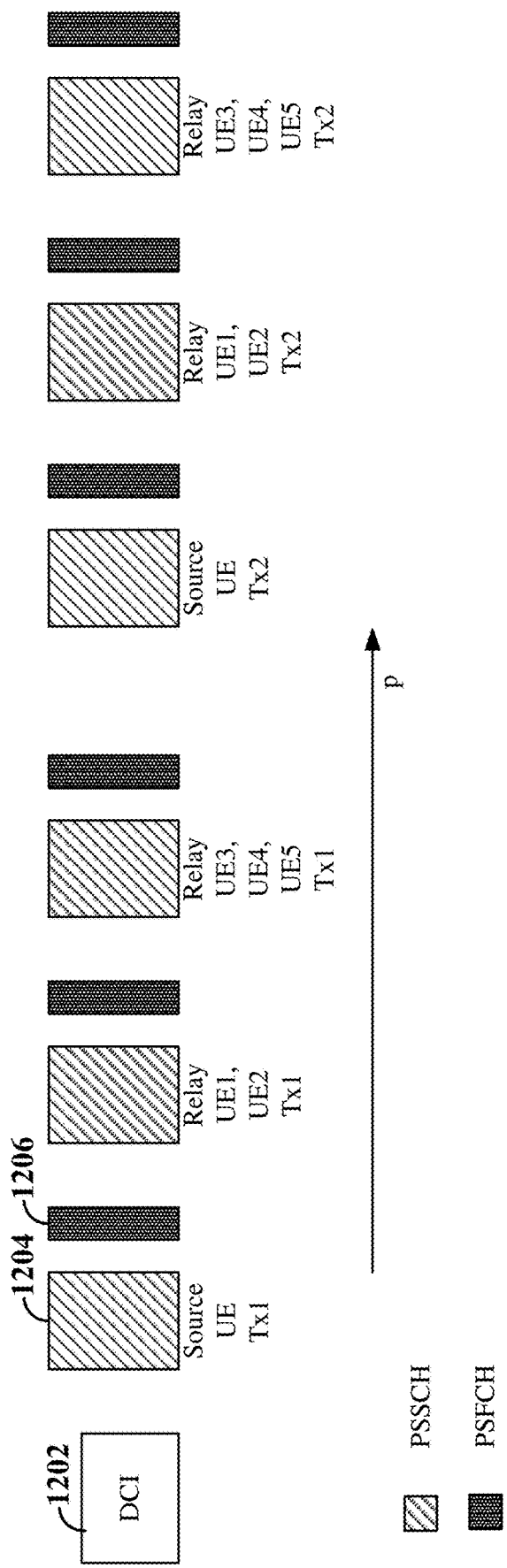
FIG. 12 is a diagram illustrating other exemplary scheduled SPS resources for relay communication according to some aspects.

FIG. 12 is a diagram illustrating other exemplary scheduled SPS resources for relay communication according to some aspects. As in the example shown in FIGS. 10 and 11, the SPS resources may be scheduled, for example, in DCI 1202 containing the SPS information associated with an SPS configuration for a relay tunnel between a source device (source UE) and a destination device (e.g., a base station). Again, for ease of explanation, the relay tunnel may correspond, for example, to the relay tunnel shown in FIG. 6. However, it should be understood that other configurations of a relay tunnel including one or more hops and including a different destination device (e.g., a destination sidelink device) may be utilized with aspects of the present disclosure.

As in FIG. 6, there may be five relay UEs (relay UE1, relay UE2, relay UE3, relay UE4, and relay UE5) and two hops. A first hop may include relay UE1 and relay UE2 (e.g., which may correspond to UEs 602d and 602e). A second hop may include relay UE3, relay UE4, and relay UE5 (e.g., which may correspond to relay UEs 602a-602c). In the example shown in FIG. 12, the SPS information may indicate periodic sidelink occasions 1204 for the source UE (e.g., UE 602f shown in FIG. 6) and one or more relay UEs (e.g., relay UE1-relay UE5). The periodic sidelink occasions 1204 may be utilized for PSSCH transmissions. The SPS information may further indicate periodic sidelink feedback occasions 1206 for each of the periodic sidelink occasions 1204. The periodic sidelink feedback occasions 1206 may be utilized for PSFCH transmissions. It should be understood that periodic uplink occasions (not shown) may further be scheduled.

As in FIGS. 10 and 11, the periodic sidelink occasions 1204 for the source UE and relay UEs are scheduled in time based on the order of transmission. For example, the source UE may transmit a packet on a first periodic sidelink occasion 1204 allocated to the source UE. The packet may be groupcast, for example, to relay UE1 and relay UE2 using a common virtual relay ID for the packet. Each of relay UE1 and relay UE2 may then identify the periodic sidelink feedback occasion 1206 on which to transmit feedback information (HARQ ACK/NACK) to the source UE and transmit respective feedback information to the source UE on the same periodic sidelink feedback occasion 1206.

In the example shown in FIG. 12, a set or subgroup of relay UEs within the same hop may utilize the same periodic sidelink occasion to forward (relay) the packet. For example, relay UE1 and relay UE2 may be allocated orthogonal or non-orthogonal resources within the same slot (e.g., the same periodic sidelink occasion) on which to forward (relay) the packet. Thus, relay UE1 and relay UE2 may each forward (relay) the same packet on the same periodic sidelink occasion 1204 that is allocated to both relay UE1 and relay UE2. The packet may be groupcast, for example, by each of relay UE1 and relay UE2 to relay UEs in the next hop (e.g., relay UE3, relay UE4 and relay UE5) using a common virtual relay ID for the packet. Each of relay UE3, relay UE4, and relay UE5 may identify the periodic sidelink feedback occasion 1206 on which to transmit feedback information (HARQ ACK/NACK) to relay UE1 and relay UE2. Thus, each of relay UE3, relay UE4, and relay UE5 may transmit respective feedback information to both relay UE1 and relay UE2 on the same periodic sidelink feedback occasion 1206.

Relay UE3, relay UE4, and relay UE5 may also be allocated orthogonal or non-orthogonal resources within the same slot (e.g., the same periodic sidelink occasion) to forward (relay) the packet. Thus, relay UE3, relay UE4, and relay UE5 may each forward (relay) the same packet on the same periodic sidelink occasion 1204 allocated to relay UE3, relay UE4, and relay UE5. In some examples, relay UE3, relay UE4, and relay UE5 may form a second hop, and may groupcast the packet to relay devices in a different hop (e.g., the first hop). For example, the packet may be groupcast to relay UE1 and relay UE2. Relay UE1/UE2 may further identify the periodic sidelink feedback occasion 1206 on which to transmit feedback information (HARQ ACK/NACK) in a PSFCH to relay UE3, relay UE4, and relay UE5.

As further shown in FIG. 12, the SPS configuration may be configured with SPS periodic sidelink occasions of a respective periodicity p for the source UE and the sets of relay UEs (not shown, for simplicity). Thus, if a NACK is received by the source UE (e.g., from relay UE1 or relay UE2 or forwarded to the source UE from the destination device), the source UE may retransmit the packet on the next (subsequent) periodic sidelink occasion (e.g., Source UE Tx2) allocated to the source UE (e.g., as determined from the periodicity p). Similarly, if a relay UE (e.g., relay UE2) receives a NACK from one of the relay UEs (e.g., relay UE3) in the next hop, relay UE2 may retransmit the packet on the next/subsequent periodic sidelink occasion (e.g., Relay UE1, UE2 Tx2) allocated to relay UE2. The number of retransmissions may be limited by the maximum number of retransmissions X.

If an ACK is received by the source UE from both UE1 and UE2 and/or the destination device, the source UE may deactivate the SPS configuration (and hence not utilize the next/subsequent periodic sidelink occasion 1204) or transmit a new packet on the next/subsequent periodic sidelink occasion 1204. Similarly, if a relay UE (e.g., relay UE2) receives an ACK from all of the relay UEs (e.g., relay UE3-relay UE5) in the next hop, relay UE2 may be prevented from (or may avoid) utilizing the next/subsequent periodic sidelink occasion 1204 allocated to relay UE2 to retransmit the packet.

Figure 13:
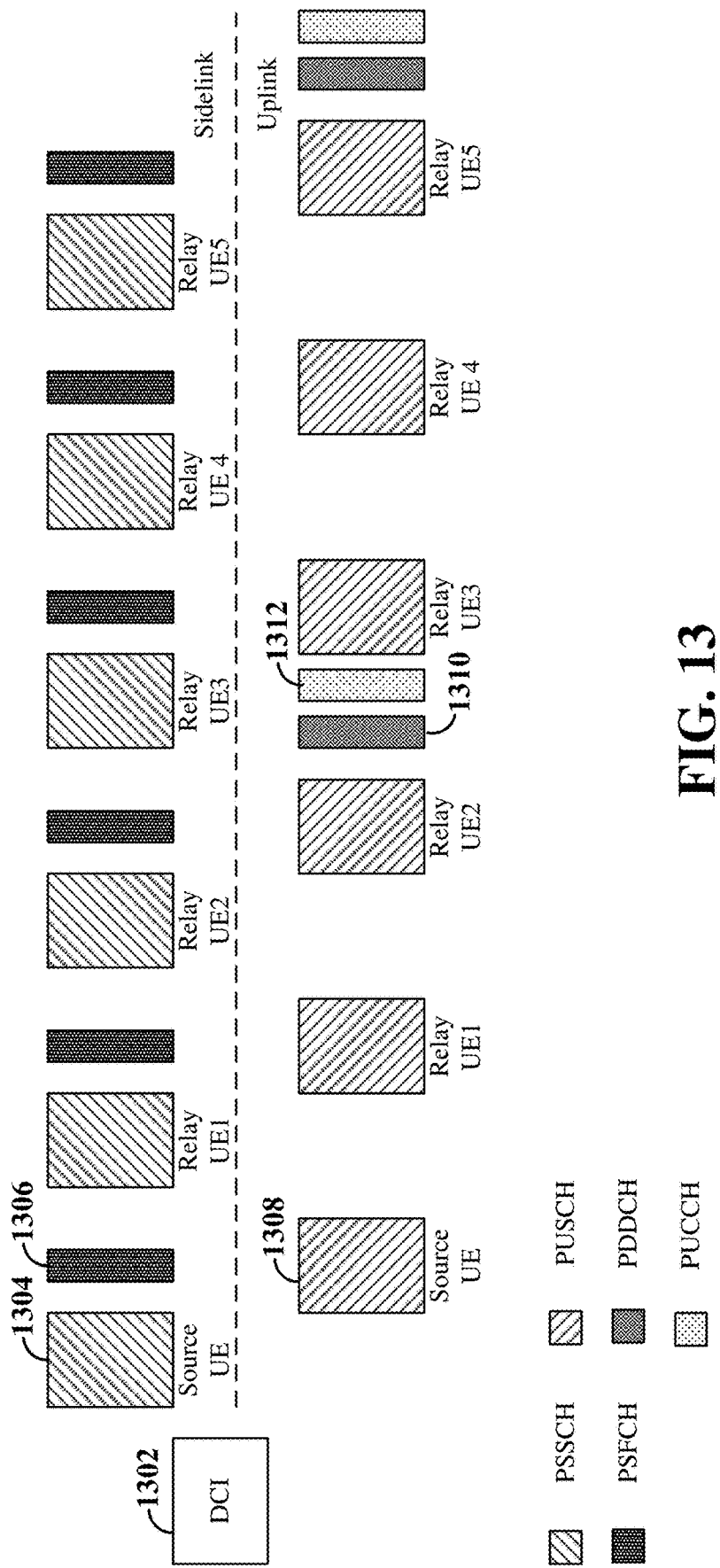
FIG. 13 is a diagram illustrating other exemplary scheduled SPS resources for relay communication according to some aspects.

FIG. 13 is a diagram illustrating other exemplary scheduled SPS resources for relay communication according to some aspects. The scheduled SPS resources may include both sidelink SPS resources and uplink SPS resources. As in the example shown in FIG. 10, the sidelink and uplink SPS resources may be scheduled, for example, in DCI 1302 containing the SPS information associated with an SPS configuration for a relay tunnel between a source device (source UE) and a destination device (e.g., a base station). Again, for ease of explanation, the relay tunnel may correspond, for example, to the relay tunnel shown in FIG. 6. However, it should be understood that other configurations of a relay tunnel including one or more hops and including a different destination device (e.g., a destination sidelink device) may be utilized with aspects of the present disclosure.

As in FIG. 6, there may be five relay UEs (relay UE1, relay UE2, relay UE3, relay UE4, and relay UE5) and two hops. A first hop may include relay UE1 and relay UE2 (e.g., which may correspond to UEs 602*d* and 602*e*). A second hop may include relay UE3, relay UE4, and relay UE5 (e.g., which may correspond to relay UEs 602*a*-602*c*). In the example shown in FIG. 13, the SPS information may indicate periodic sidelink occasions 1304 for the source UE (e.g., UE 602*f* shown in FIG. 6) and one or more relay UEs (e.g., relay UE1-relay UE5). The SPS information may further indicate periodic uplink occasions 1308 for the source UE and one or more of the relay UEs (e.g., relay UE1-relay UE5). In the example shown in FIG. 13, the source UE and each of the relay UEs (relay UE1-relay UE5) each have a Uu connection to the base station. The periodic sidelink occasions 1304 may be utilized for PSSCH transmissions, while the periodic uplink occasions 1308 may be utilized for PUSCH transmissions.

The SPS information may further indicate periodic feedback occasions 1306 and 1310 for each of the periodic sidelink occasions 1304 and periodic uplink occasions 1308, respectively. The periodic sidelink feedback occasions 1306 may be utilized for PSFCH transmissions, while the periodic downlink feedback occasions 1310 may be utilized for PDCCH transmissions. Similar to FIG. 11, the SPS information may further indicate periodic uplink feedback occasions 1312 associated with the periodic uplink occasions 1308. The periodic uplink feedback occasions 1312 may be utilized for PUCCH transmissions.

In the example shown in FIG. 13, HARQ feedback transmissions for periodic uplink occasions may be reduced by delaying feedback transmissions for Z occasions, where Z is the number of periodic uplink occasions between the periodic uplink occasion on which the packet is transmitted and the periodic feedback occasion on which feedback information is transmitted. For example, for each Uu link, K1 may be defined to align in time multiple HARQ feedback transmissions. For example, the base station may simultaneously transmit feedback information via a PDCCH to multiple UEs that transmitted the same packet to the base station. In some examples, this may be configured per hop. For example, the number Z of periodic uplink occasions may be based on the number of relay UEs within a particular hop. In the example shown in FIG. 13, the base station may transmit respective feedback information for the source UE's initial transmission and the relay transmissions of each of relay UE1 and relay UE2 within a PDCCH on the same periodic downlink feedback occasion 1310 following relay UE2's periodic uplink occasion 1308. In addition, the base station may further transmit feedback information for the relay transmissions of relay UE3, relay UE4, and relay UE5 within a PDCCH on the same periodic downlink feedback occasion 1310 following relay UE5's periodic uplink occasion 1308.

In addition, one or more UEs at hop j that are configured to monitor the periodic uplink occasions 1308 of one or more UEs at hop j−1 may simultaneously transmit feedback information to the one or more UEs at hop j−1 via the same periodic uplink feedback occasion 1312. For example, relay UE1 and relay UE2 may each transmit respective feedback information to one another and to the source UE on the periodic uplink feedback occasion 1312 following relay UE2's periodic uplink occasion 1308. In addition, relay UE3, relay UE4, and relay UE5 may each transmit respective feedback information to relay UE1 and relay UE2 on the periodic uplink feedback occasion 1312 relay UE5's periodic uplink occasion 1308.

Figure 14:
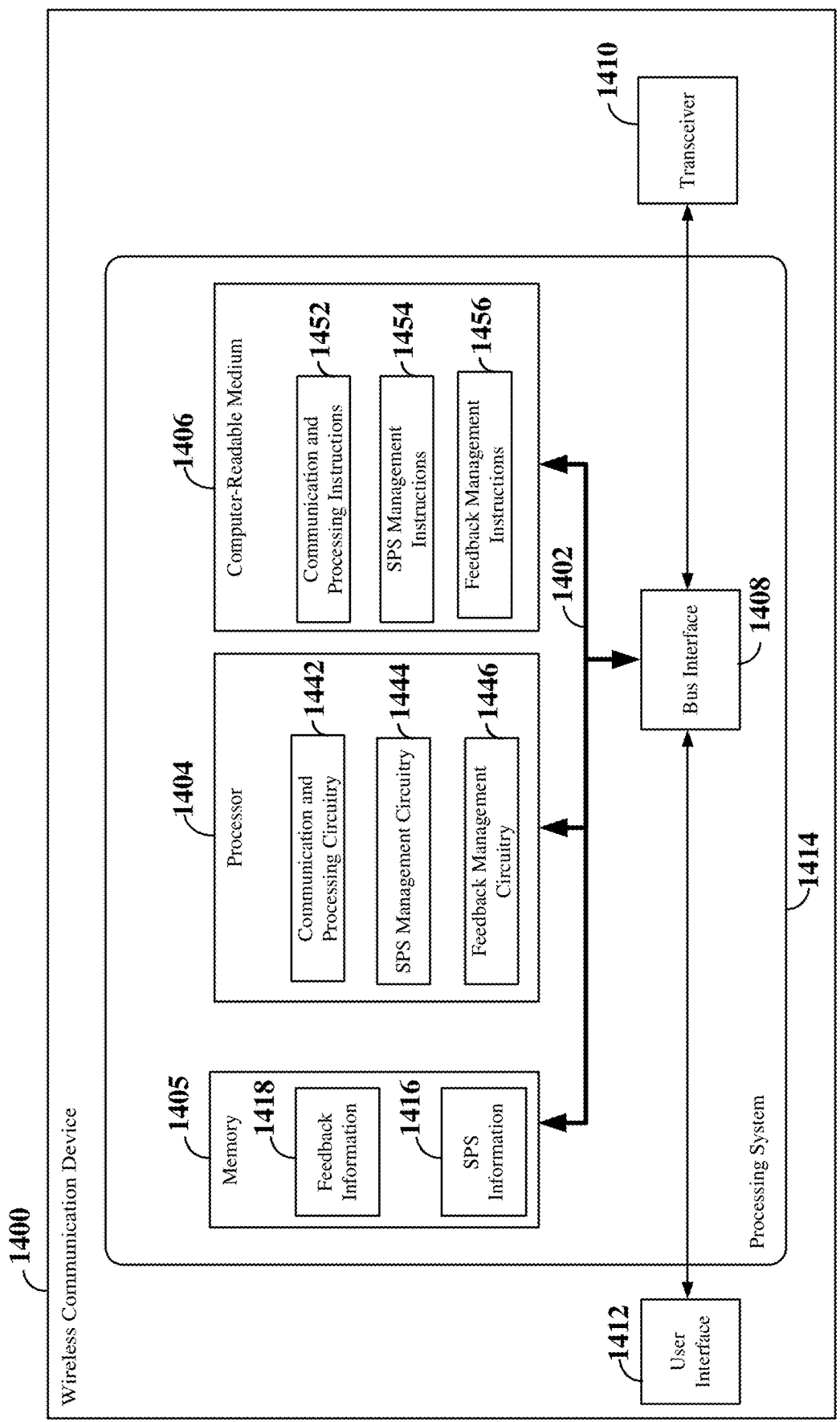
FIG. 14 is a block diagram illustrating an example of a hardware implementation for a wireless communication device employing a processing system according to some aspects.

FIG. 14 is a block diagram illustrating an example of a hardware implementation for a wireless communication device 1400 employing a processing system 1414. For example, the wireless communication device 1400 may correspond to a sidelink device, such as a V2X device, D2D device or other UE or wireless communication device configured for sidelink communication, as shown and described above in reference to FIGS. 1, 2, 6, and/or 9.

The wireless communication device 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1400 may be configured to perform any one or more of the functions described herein. That is, the processor 1404, as utilized in the wireless communication device 1400, may be used to implement any one or more of the processes and procedures described below.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 links together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further.

A bus interface 1408 provides an interface between the bus 1402 and a transceiver 1410. The transceiver 1410 provides a means for communicating with various other apparatus over a transmission medium (e.g., air interface). Depending upon the nature of the apparatus, a user interface 1412 (e.g., keypad, display, touch screen, speaker, microphone, control knobs, etc.) may also be provided. Of course, such a user interface 1412 is optional, and may be omitted in some examples.

The processor 1404 is responsible for managing the bus 1402 and general processing, including the execution of software stored on the computer-readable medium 1406. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. In some examples, the computer-readable medium 1406 may be part of the memory 1405. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include communication and processing circuitry 1442, configured to communicate with one or more sidelink devices (e.g., other UEs) via a sidelink (e.g., PC5 interface). In addition, the communication and processing circuitry 1442 may be configured to communicate with a base station (e.g., gNB or eNB) via a Uu link. In some examples, the communication and processing circuitry 1442 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1442 may be configured to receive SPS information

1416 associated with an SPS configuration for relaying packets from a source device (source UE) to a destination device (e.g., base station or destination sidelink device) via at least one relay device in a relay tunnel (relay sidelink tunnel). The SPS information 1416 may include, for example, periodic transmit occasions, such as periodic sidelink occasions and/or periodic uplink occasions, for the source device and the at least one relay device. The SPS information 1416 may be stored, for example, in memory 1405. In examples in which the destination device is a base station, the communication and processing circuitry 1442 may be configured to receive the SPS information 1416 from the base station within downlink control information. In this example, the periodic transmit occasions may include periodic sidelink occasions and periodic uplink occasions. In some examples, the communication and processing circuitry 1442 may be configured to receive both the periodic uplink occasions and periodic sidelink occasions from the base station. In other examples, the communication and processing circuitry 1442 may be configured to receive the periodic uplink occasions from the base station and the periodic sidelink occasions from a scheduling sidelink device. The scheduling sidelink device may be the destination sidelink device or a relay device of the at least one relay device. For example, the relay device may be on a last hop closest to the base station.

The communication and processing circuitry 1442 may further be configured to transmit a packet to one or more relay devices and/or to the destination device on a periodic transmit occasion allocated to the wireless communication device in the SPS information 1416. The communication and processing circuitry 1442 may further be configured to receive feedback information from the one or more relay devices and/or the destination device on a periodic feedback occasion associated with the periodic transmit occasion.

In addition, the communication and processing circuitry 1442 may be configured to receive a packet on one or more periodic transmit occasions allocated to other relay devices based on the SPS information 1416. The communication and processing circuitry 1442 may further be configured to transmit feedback information (e.g., HARQ ACK/NACK) to each of the other relay devices on one or more periodic feedback occasions associated with the one or more periodic transmit occasions. The communication and processing circuitry 1442 may further be configured to execute communication and processing instructions (software) 1452 stored in the computer-readable medium 1406 to implement one or more of the functions described herein.

The processor 1404 may further include SPS management circuitry 1444, configured to manage the SPS configuration for the wireless communication device 1400. In examples in which the wireless communication device 1400 is the source device, the SPS management circuitry 1444 may be configured to schedule the periodic sidelink occasions and to operate together with the communication and processing circuitry 1442 to transmit the periodic sidelink occasions to the at least one relay device (and the destination sidelink device if the destination device is the destination sidelink device).

In some examples, the SPS management circuitry 1444 may be configured to utilize the periodic transmit occasions allocated to the wireless communication device 1400 in the SPS information 1416 upon activation of the SPS configuration. In examples in which the wireless communication device is the source device, the SPS management circuitry 1444 may be configured to operate together with the communication and processing circuitry 1442 to transmit a packet within a PSSCH on a periodic sidelink occasion allocated to the wireless communication device 1400 in the SPS information 1416. In some examples, the SPS information 1416 may further allocate periodic uplink occasions to the wireless communication device (e.g., in examples in which the wireless communication device 1400 has a Uu link with the base station). In this example, the SPS management circuitry 1444 may further be configured to operate together with the communication and processing circuitry 1442 to transmit the packet within a PUSCH on a periodic uplink occasion allocated to the wireless communication device 1400.

In examples in which the wireless communication device is a relay device, the SPS management circuitry 1444 may further be configured to operate together with the communication and processing circuitry 1442 to receive the packet within a PSSCH on a periodic sidelink occasion or a PUSCH on a periodic uplink occasion allocated to the source device or another relay device in a prior hop. The SPS management circuitry 1444 may then further be configured to operate together with the communication and processing circuitry 1442 to forward (relay) the packet within another PSSCH on the periodic sidelink occasion allocated to the wireless communication device 1400 in the SPS information 1416 and/or within another PUSCH on the periodic uplink occasion allocated to the wireless communication device 1400 in the SPS information. The SPS management circuitry 1444 may further be configured to execute SPS management instructions (software) 1454 stored in the computer-readable medium 1406 to implement one or more of the functions described herein.

The processor 1404 may further include feedback management circuitry 1446, configured to manage feedback information for SPS relay communication. In some examples, the SPS information 1416 may indicate the relaying type for each link (e.g., relay sidelink or Uu link) between the wireless communication device and another device. In examples in which the relaying type is DF for one or more links, the feedback management circuitry 1446 may be configured to generate and transmit feedback information (e.g., HARQ ACK/NACK) for each relay packet received on a periodic sidelink occasion or periodic uplink occasion allocated to another device (e.g., source device or other relay device). The feedback information may be transmitted within, for example, a PSFCH on a periodic sidelink feedback occasion or a PUCCH on a periodic uplink feedback occasion. In some examples, the periodic uplink feedback occasion may occur after one or more subsequent periodic uplink occasions allocated to other relay devices. The number of periodic uplink transmissions Z between the periodic uplink occasion on which the packet is received and the periodic uplink feedback occasion may be indicated, for example, in the SPS information 1416.

The feedback management circuitry 1446 may further be configured to receive feedback information 1418 (e.g., HARQ ACK/NACK) from a relay device or the destination device and to provide the feedback information to the SPS management circuitry 1444. In examples in which the feedback information 1418 is a NACK, the SPS management circuitry 1444 may further be configured to retransmit the packet on the next/subsequent periodic transmit occasion(s) allocated to the wireless communication device. In some examples, the SPS management circuitry 1444 may be configured to retransmit the packet one or more times until an ACK is received or until a maximum number of retransmissions X configured for the SPS configuration is reached. For example, the maximum number of retransmissions X may be indicated in the SPS information 1416 or configured via RRC or MAC-CE. Each retransmission may utilize a next/subsequent periodic transmit occasion, as determined by the periodicity p of the SPS configuration for the wireless communication device 1400.

In examples in which the feedback management circuitry 1446 receives an ACK from all relay devices in the next hop and/or the destination device, the SPS management circuitry 1444 may be configured to not retransmit the packet on the next/subsequent periodic transmit occasion. In examples in which the wireless communication device is the source device, the SPS management circuitry 1444 may then deactivate the SPS configuration or utilize the SPS configuration to transmit a new packet. The feedback management circuitry 1446 may further be configured to execute feedback management instructions (software) 1456 stored in the computer-readable medium 1406 to implement one or more of the functions described herein.

Figure 15:
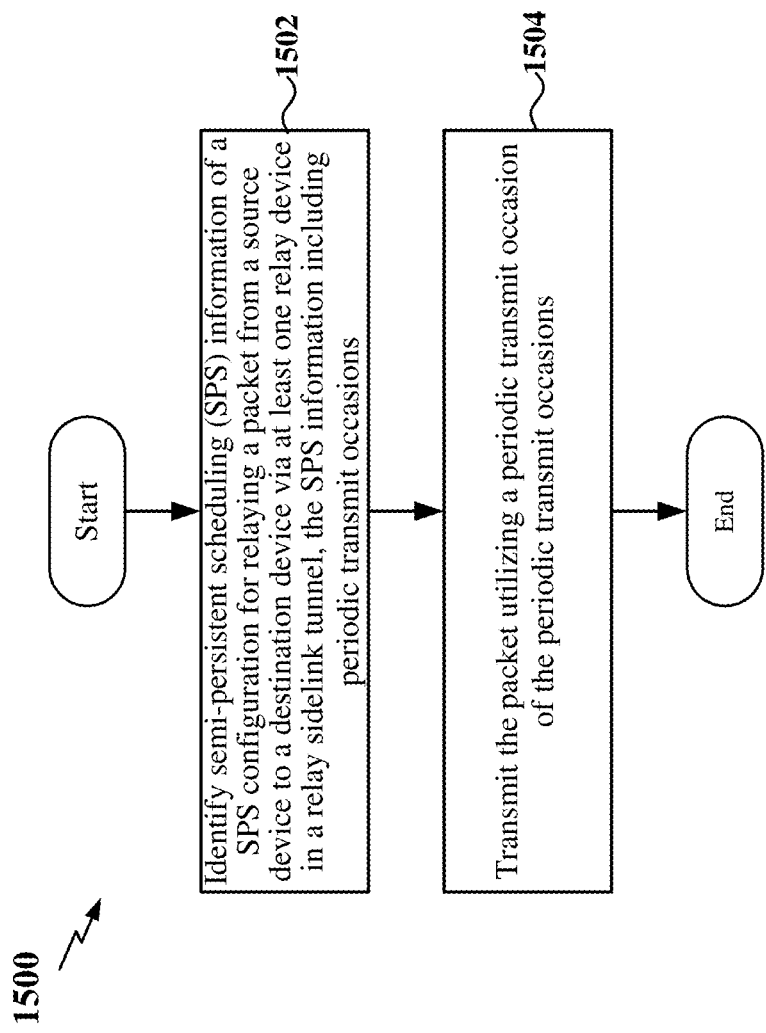
FIG. 15 is a flow chart of an exemplary method for sidelink relay communication using SPS resources according to some aspects.

FIG. 15 is a flow chart 1500 of an exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 1502, the wireless communication device (e.g., a UE configured for sidelink communication) may identify semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In some examples, the wireless communication device may receive the SPS information from at least one of the destination device or a relay device of the at least one relay device. Here, the destination device can include a base station or a destination sidelink device. In examples in which the destination device is a base station, the wireless communication device may receive the SPS information from the base station within downlink control information. In this example, the periodic transmit occasions may include periodic sidelink occasions and periodic uplink occasions. In some examples, the wireless communication device may receive both the periodic uplink occasions and periodic sidelink occasions from the base station. In other examples, the wireless communication device may receive the periodic uplink occasions from the base station and may receive the periodic sidelink occasions from a scheduling sidelink device allocating the periodic sidelink occasions. In some examples, the scheduling sidelink device may be the destination sidelink device or a relay device of the at least one relay device. For example, the relay device may be on a last hop closest to the base station.

The scheduling sidelink device may schedule the periodic sidelink occasions when the destination device is the base station or when the destination device is the destination sidelink device. In examples in which the wireless communication device is a relay device, the wireless communication device may either receive the periodic sidelink occasions from the scheduling sidelink device or the wireless communication device may be the scheduling sidelink device that schedules the periodic sidelink occasions and transmits the periodic sidelink occasions to the source device and other relay device(s). In examples in which the wireless communication device is the source device, the wireless communication device may be the scheduling sidelink device that schedules the periodic sidelink occasions and transmits the SPS information including the periodic sidelink occasions to the at least one relay device (and the destination sidelink device if the destination device is the destination sidelink device).

In examples in which the wireless communication device is a relay device, the wireless communication device may further forward the SPS information to the source device via a sidelink. In some examples, the wireless communication device may forward the SPS information to the source device in a single frequency network (SFN) manner. For example, the SPS management circuitry 1444, together with the communication and processing circuitry 1442 and transceiver 1410, shown and described above in connection with FIG. 14, may provide a means to identify the SPS information.

At 1504, the wireless communication device may transmit the packet utilizing a periodic transmit occasion of the periodic transmit occasions. In some examples, the wireless communication device may transmit the packet utilizing a periodic sidelink occasion of the periodic sidelink occasions. In other examples, the wireless communication device may transmit the packet utilizing a periodic uplink occasion of the periodic uplink occasions. In still other examples, the wireless communication device may transmit the packet utilizing a periodic sidelink occasion of the periodic sidelink occasions and may further transmit the packet utilizing a periodic uplink occasion of the periodic uplink occasions.

In some examples, the relay sidelink tunnel includes one or more hops, each including one or more relay devices of the at least one relay device. In some examples, a hop of the one or more hops includes a plurality of relay devices including the wireless communication device. In this example, the wireless communication device may transmit the packet within a same time slot and on orthogonal or non-orthogonal resources utilized by each of the plurality of relay devices in the hop to transmit the packet. For example, the SPS management circuitry 1444, together with the communication and processing circuitry 1442 and transceiver 1410, shown and described above in connection with FIG. 14, may provide a means to transmit the packet.

Figure 16:
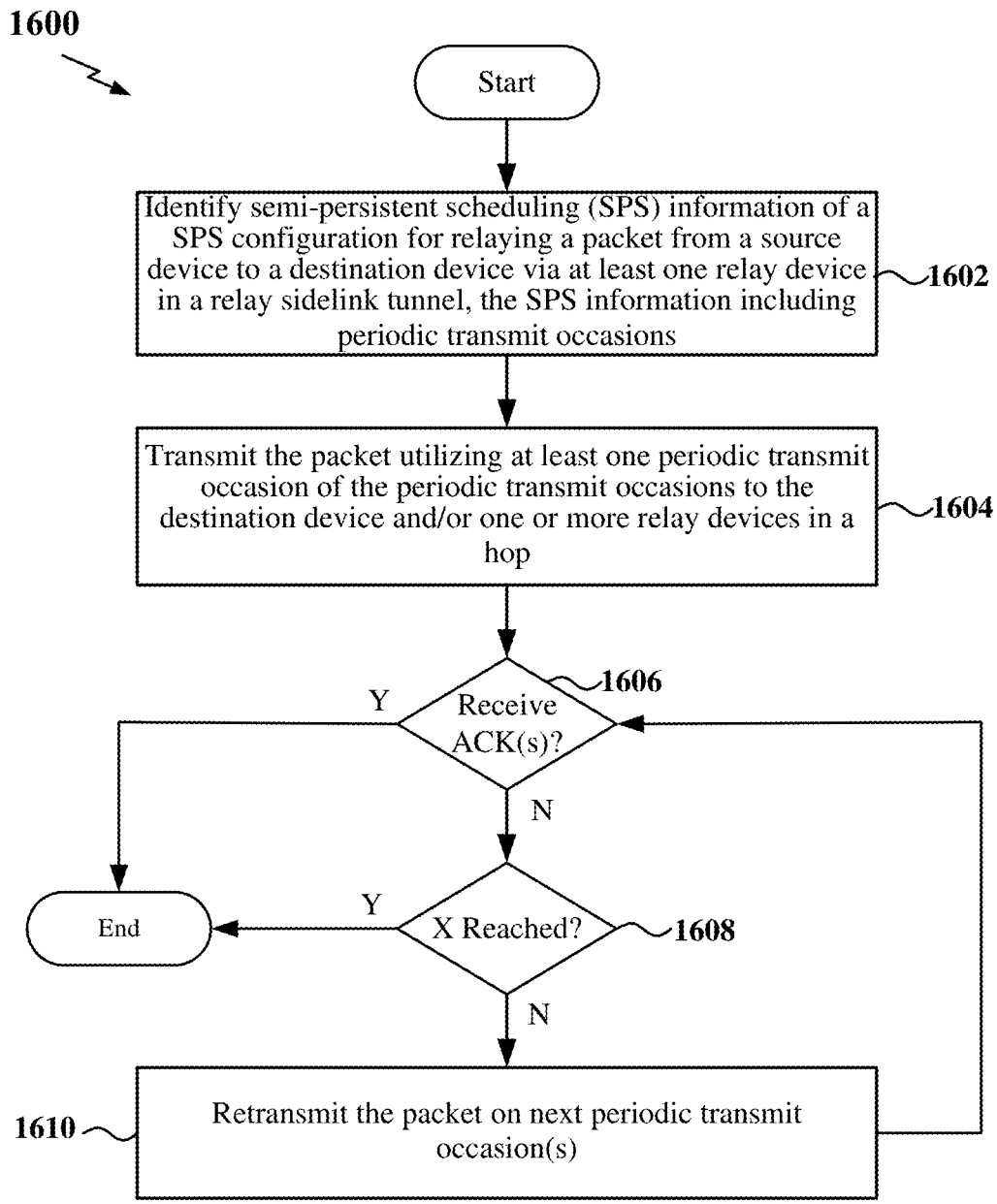
FIG. 16 is a flow chart of another exemplary method for sidelink relay communication using SPS resources according to some aspects.

FIG. 16 is a flow chart 1600 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 1602, the wireless communication device (e.g., a UE configured for sidelink communication) may identify semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In examples in which the destination device is a base station, the periodic transmit occasions may include periodic sidelink occasions and periodic uplink occasions. In examples in which the destination device is a destination sidelink device, the periodic transmit occasions may include periodic sidelink occasions. In some examples, the relay sidelink tunnel includes one or more hops, each including one or more relay devices of the at least one relay device. In this example, the SPS information may further indicate the one or more hops and the one or more relay devices in each of the hops. The SPS information may further indicate the relaying type assigned to each of the relay devices. The relaying type may include, for example, DF, AF, or CF. For example, the SPS management circuitry 1444, together with the communication and processing circuitry 1442 and transceiver 1410, shown and described above in connection with FIG. 14, may provide a means to identify the SPS information.

At block 1604, the wireless communication device may transmit the packet utilizing at least one periodic transmit occasion of the periodic transmit occasions to the destination device and/or one or more relay devices in a hop. In some examples, the wireless communication device may transmit the packet utilizing a periodic sidelink occasion of the periodic sidelink occasions to one or more relay devices in the hop and/or to a destination sidelink device. In other examples, the wireless communication device may transmit the packet utilizing a periodic uplink occasion of the periodic uplink occasions to a base station as the destination device. In still other examples, the wireless communication device may transmit the packet utilizing a periodic sidelink occasion of the periodic sidelink occasions and may further transmit the packet utilizing a periodic uplink occasion of the periodic uplink occasions.

In some examples, the one or more relay devices are implementing DF, such that each of the one or more relay devices may attempt to decode the packet and transmit feedback information to the wireless communication device. For example, the wireless communication device may transmit the packet utilizing a periodic sidelink occasion and may then receive feedback information indicating an acknowledgement (ACK) or negative acknowledgement (NACK) of the packet on a periodic sidelink feedback occasion associated with the periodic sidelink occasion. In some examples, the one or more relay devices in the hop may include a plurality of relay devices and the wireless communication device may transmit the packet utilizing the periodic sidelink occasion to the plurality of relay devices in the hop using a common virtual relay ID as a destination ID for all relay devices of the plurality of relay devices in the hop. The common virtual relay ID may identify the periodic sidelink feedback occasion. In addition, the feedback information may include respective feedback information from each of the plurality of relay devices in the hop. In some examples, the wireless communication device may transmit the common virtual relay ID within second stage sidelink control information or a medium access control control element (MAC-CE) associated with a physical sidelink control channel including the packet. In other examples, the wireless communication device may transmit the packet to a relay device of the one or more relay devices in the hop using a physical relay ID of the relay device. For example, the SPS management circuitry 1444, together with the communication and processing circuitry 1442 and transceiver 1410, shown and described above in connection with FIG. 14, may provide a means to transmit the packet.

At block 1606, the wireless communication device may determine whether an ACK was received from all of the one or more relay devices in the hop and/or from the destination device. In examples in which the destination device is the base station, the wireless communication device may receive feedback information from the base station on a periodic downlink feedback occasion associated with the periodic uplink occasion utilized by the wireless communication device to transmit the packet. In addition, as described above, in examples in which the wireless communication device transmits the packet on a periodic sidelink occasion to the one or more relay devices in the hop and/or the destination sidelink device, the wireless communication device may receive feedback information from the one or more relay devices and/or the destination sidelink device on a periodic sidelink feedback occasion associated with the periodic sidelink occasion. For example, the feedback management circuitry 1446, together with the communication and processing circuitry 1442 and transceiver 1410, shown and described above in connection with FIG. 14, may provide a means to determine whether an ACK was received.

If the wireless communication device receives an ACK from all of the one or more relay devices in the hop and/or the destination device (Y branch of block 1606), the process ends. If an ACK is not received from all of the one or more relay devices in the hop and/or from the destination device (N branch of block 1606), at block 1608, the wireless communication device may determine whether a maximum number of retransmissions of the packet (X) has been reached. The maximum number of retransmissions (X) may be configured, for example, via RRC or MAC-CE. For example, the feedback management circuitry 1446, together with the SPS management circuitry 1444, shown and described above in connection with FIG. 14 may provide a means to determine whether the maximum number of retransmissions (X) has been reached.

If the maximum number of retransmissions has been reached (Y branch of block 1608), the process ends. If the maximum number of retransmissions (X) has not been reached (N branch of block 1608), at block 1610, the wireless communication device may retransmit the packet on the next periodic transmit occasion(s) allocated to the wireless communication device. The next periodic transmit occasion(s) may be determined by the respective periodicity p of the periodic transmit occasions (e.g., periodic sidelink occasions and/or periodic uplink occasions) allocated to the wireless communication device. For example, the SPS management circuitry 1444, together with the communication and processing circuitry 1442 and transceiver 1410, shown and described above in connection with FIG. 14, may provide a means to retransmit the packet.

Figure 17:
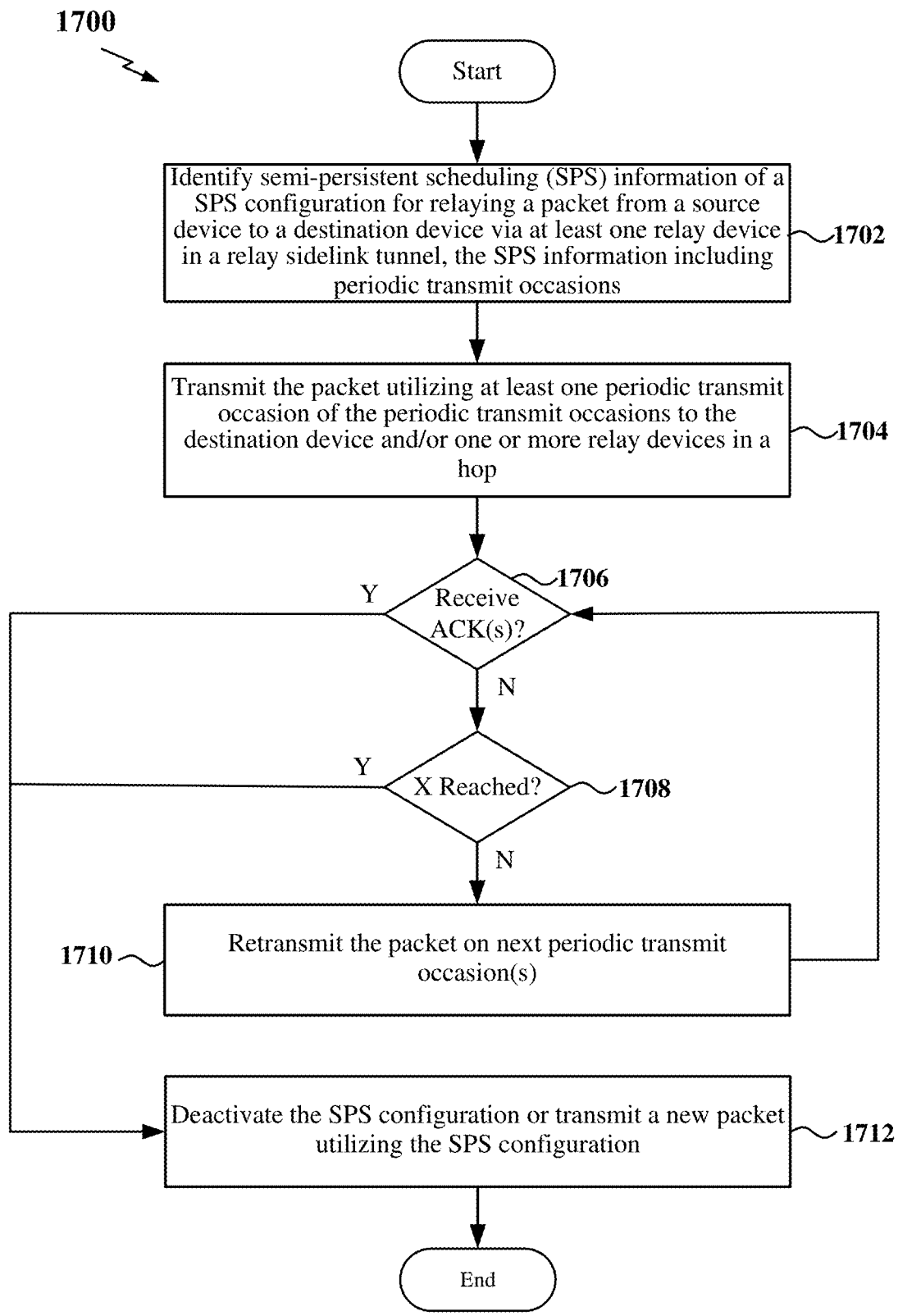
FIG. 17 is a flow chart of another exemplary method for sidelink relay communication using SPS resources according to some aspects.

FIG. 17 is a flow chart 1700 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 1702, the wireless communication device (e.g., a UE configured for sidelink communication) may identify semi-persistent scheduling (SPS) information of a SPS configuration for relaying a packet from a source device to a destination device via at least one relay device in a relay sidelink tunnel. In the example shown in FIG. 17, the wireless communication device may be the source device.

The SPS information can include periodic transmit occasions for the source device and the at least one relay device. In examples in which the destination device is a base station, the periodic transmit occasions may include periodic sidelink occasions and periodic uplink occasions. In examples in which the destination device is a destination sidelink device, the periodic transmit occasions may include periodic sidelink occasions. In some examples, the relay sidelink tunnel includes one or more hops, each including one or more relay devices of the at least one relay device. In this example, the SPS information may further indicate the one or more hops and the one or more relay devices in each of the hops. The SPS information may further indicate the relaying type assigned to each of the relay devices. The relaying type may include, for example, DF, AF, or CF. For example, the SPS management circuitry 1444, together with the communication and processing circuitry 1442 and transceiver 1410, shown and described above in connection with FIG. 14, may provide a means to identify the SPS information.

At block 1704, the wireless communication device may transmit the packet utilizing at least one periodic transmit occasion of the periodic transmit occasions to the destination device and/or one or more relay devices in a hop. In some examples, the wireless communication device may transmit the packet utilizing a periodic sidelink occasion of the periodic sidelink occasions to one or more relay devices in the hop and/or to a destination sidelink device. In other examples, the wireless communication device may transmit the packet utilizing a periodic uplink occasion of the periodic uplink occasions to a base station as the destination device. In still other examples, the wireless communication device may transmit the packet utilizing a periodic sidelink occasion of the periodic sidelink occasions and may further transmit the packet utilizing a periodic uplink occasion of the periodic uplink occasions.

In some examples, the one or more relay devices are implementing DF, such that each of the one or more relay devices may attempt to decode the packet and transmit feedback information to the wireless communication device. For example, the wireless communication device may transmit the packet utilizing a periodic sidelink occasion and may then receive feedback information indicating an acknowledgement (ACK) or negative acknowledgement (NACK) of the packet on a periodic sidelink feedback occasion associated with the periodic sidelink occasion. In some examples, the one or more relay devices in the hop may include a plurality of relay devices and the wireless communication device may transmit the packet utilizing the periodic sidelink occasion to the plurality of relay devices in the hop using a common virtual relay ID as a destination ID for all relay devices of the plurality of relay devices in the hop. The common virtual relay ID may identify the periodic sidelink feedback occasion. In addition, the feedback information may include respective feedback information from each of the plurality of relay devices in the hop. In some examples, the wireless communication device may transmit the common virtual relay ID within second stage sidelink control information or a medium access control element (MAC-CE) associated with a physical sidelink control channel including the packet. In other examples, the wireless communication device may transmit the packet to a relay device of the one or more relay devices in the hop using a physical relay ID of the relay device. For example, the SPS management circuitry 1444, together with the communication and processing circuitry 1442 and transceiver 1410, shown and described above in connection with FIG. 14, may provide a means to transmit the packet.

At 1706, the wireless communication device may determine whether an ACK was received from all of the one or more relay devices in the hop and/or from the destination device. In examples in which the destination device is the base station, the wireless communication device may receive feedback information from the base station on a periodic downlink feedback occasion associated with the periodic uplink occasion utilized by the wireless communication device to transmit the packet. In addition, as described above, in examples in which the wireless communication device transmits the packet on a periodic sidelink occasion to the one or more relay devices in the hop and/or the destination sidelink device, the wireless communication device may receive feedback information from the one or more relay devices and/or the destination sidelink device on a periodic sidelink feedback occasion associated with the periodic sidelink occasion. For example, the feedback management circuitry 1446, together with the communication and processing circuitry 1442 and transceiver 1410, shown and described above in connection with FIG. 14, may provide a means to determine whether an ACK was received.

If an ACK is not received from all of the one or more relay devices in the hop and/or from the destination device (N branch of block 1706), at block 1708, the wireless communication device may determine whether a maximum number of retransmissions of the packet (X) has been reached. The maximum number of retransmissions (X) may be configured, for example, via RRC or MAC-CE. For example, the feedback management circuitry 1446, together with the SPS management circuitry 1444, shown and described above in connection with FIG. 14 may provide a means to determine whether the maximum number of retransmissions (X) has been reached.

If the maximum number of retransmissions (X) has not been reached (N branch of block 1708), at block 1710, the wireless communication device may retransmit the packet on the next periodic transmit occasion(s) allocated to the wireless communication device. The next periodic transmit occasion(s) may be determined by the respective periodicity p of the periodic transmit occasions (e.g., periodic sidelink occasions and/or periodic uplink occasions) allocated to the wireless communication device. For example, the SPS management circuitry 1444, together with the communication and processing circuitry 1442 and transceiver 1410, shown and described above in connection with FIG. 14, may provide a means to retransmit the packet.

If the wireless communication device receives an ACK from all of the one or more relay devices in the hop and/or the destination device (Y branch of block 1706) or if the maximum number of retransmissions has been reached (Y branch of block 1708), at block 1712, the wireless communication device may deactivate the SPS configuration or transmit a new packet utilizing the SPS configuration. For example, the wireless communication device may transmit the new packet on the next periodic transmit occasion(s) allocated to the wireless communication device. For example, the SPS management circuitry 1444, together with the communication and processing circuitry 1442 and transceiver 1410, shown and described above in connection with FIG. 14 may provide a means to deactivate the SPS configuration or transmit the new packet.

Figure 18:
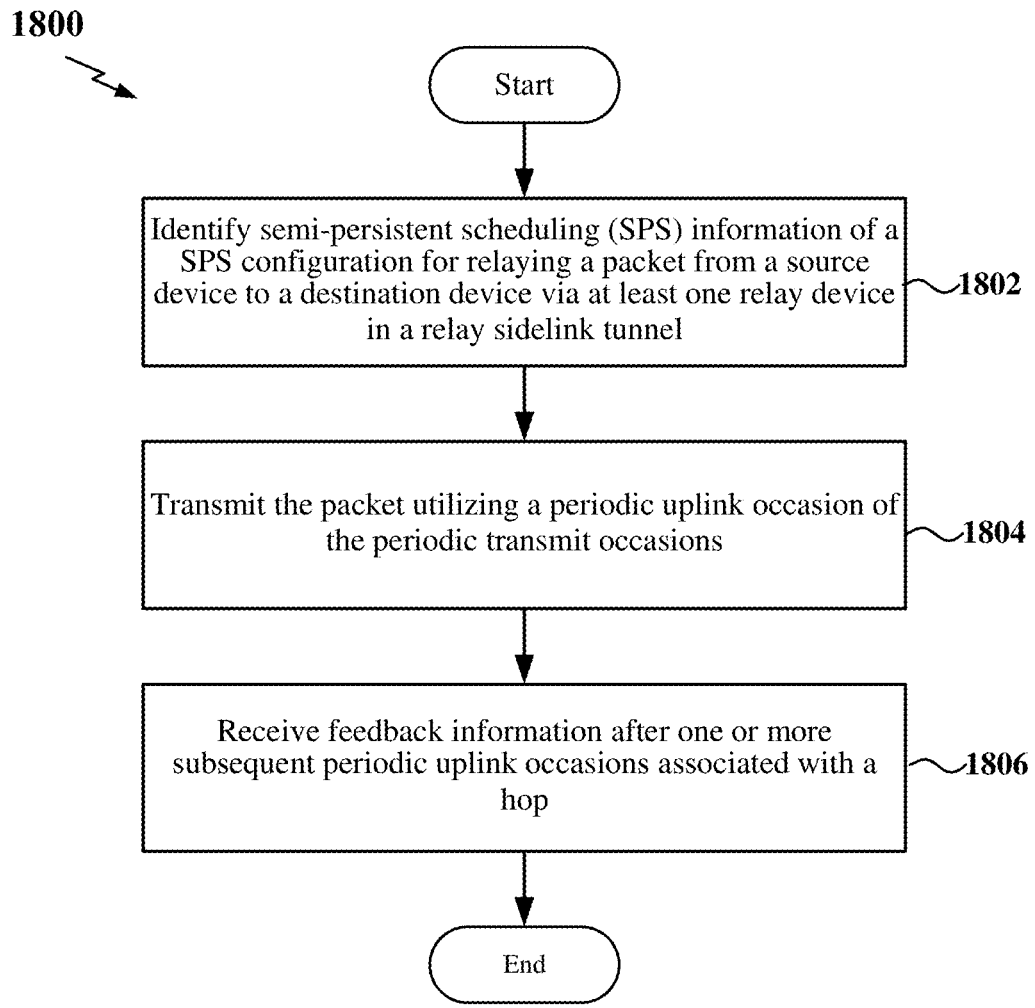
FIG. 18 is a flow chart of another exemplary method for sidelink relay communication using SPS resources according to some aspects.

FIG. 18 is a flow chart 1800 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 1802, the wireless communication device (e.g., a UE configured for sidelink communication) may identify semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In examples in which the destination device is a base station, the periodic transmit occasions may include periodic sidelink occasions and periodic uplink occasions. In some examples, the relay sidelink tunnel includes one or more hops, each including one or more relay devices of the at least one relay device. In this example, the SPS information may further indicate the one or more hops and the one or more relay devices in each of the hops. For example, the SPS management circuitry 1444, together with the communication and processing circuitry 1442 and transceiver 1410, shown and described above in connection with FIG. 14, may provide a means to identify the SPS information.

At block 1804, the wireless communication device may transmit the packet utilizing a periodic uplink occasion of the periodic transmit occasions to the base station. For example, the SPS management circuitry 1444, together with the communication and processing circuitry 1442 and transceiver 1410, shown and described above in connection with FIG. 14, may provide a means to transmit the packet.

At block 1806, the wireless communication device may receive feedback information indicating an acknowledgement or negative acknowledgement of the packet after one or more subsequent periodic uplink occasions associated with a hop. The feedback information may further indicate a respective additional acknowledgement or negative acknowledgement for each of the one or more subsequent periodic transmit occasions. For example, the one or more subsequent periodic uplink occasions may be allocated to one or more relay devices in the hop.

In some examples, the number of subsequent periodic uplink occasions (Z) between the periodic uplink occasion on which the packet is transmitted and the periodic feedback occasion on which feedback information is transmitted may be determined by the base station. For example, for each Uu link, K1 may be defined to align in time multiple HARQ feedback transmissions. For example, the base station may simultaneously transmit feedback information via a PDCCH to multiple devices (e.g., multiple relay devices or the source device and one or more relay devices) that transmitted the same packet to the base station. In some examples, this may be configured per hop. For example, the number Z of periodic uplink occasions may be based on the number of relay devices within a particular hop.

As another example, one or more relay devices at hop j may be configured to monitor the periodic uplink occasions of one or more relay devices at hop j−1. In this example, the base station may allocate PUCCH resources for a periodic uplink feedback occasion to enable the relay devices at hop j to simultaneously transmit feedback information to the one or more relay devices at hop j−1. For example, the feedback management circuitry 1446, together with the communication and processing circuitry 1442 and transceiver 1410, shown and described above in connection with FIG. 14, may provide a means to receive the feedback information.

Figure 19:
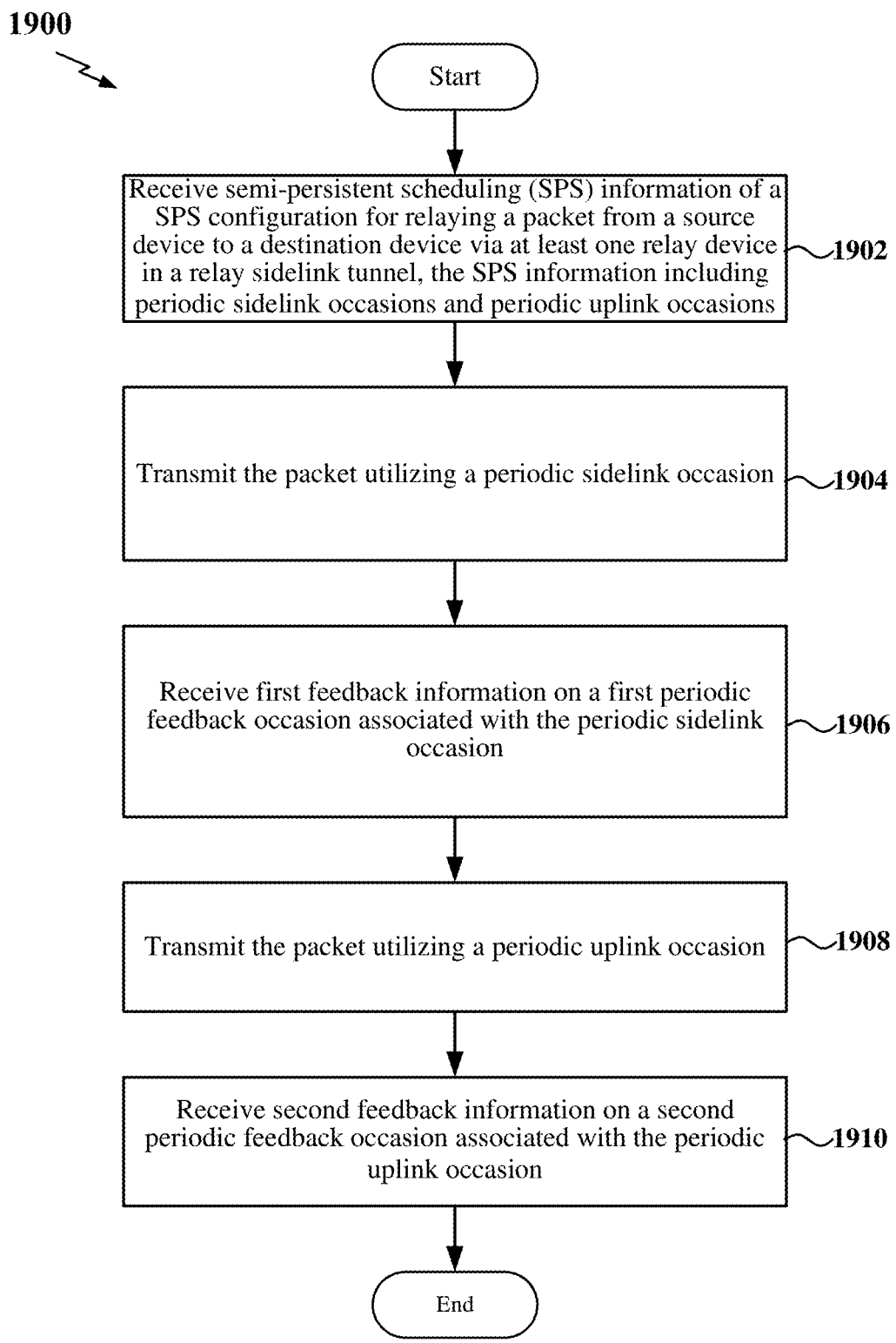
FIG. 19 is a flow chart of another exemplary method for sidelink relay communication using SPS resources according to some aspects.

FIG. 19 is a flow chart 1900 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 1902, the wireless communication device (e.g., a UE configured for sidelink communication) may receive semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In examples in which the destination device is a base station, the periodic transmit occasions may include periodic sidelink occasions and periodic uplink occasions. For example, the SPS management circuitry 1444, together with the communication and processing circuitry 1442 and transceiver 1410, shown and described above in connection with FIG. 14, may provide a means to identify the SPS information.

At block 1904, the wireless communication device may transmit the packet utilizing a periodic sidelink occasion of the periodic sidelink occasions to one or more relay devices. For example, the SPS management circuitry 1444, together with the communication and processing circuitry 1442 and transceiver 1410, shown and described above in connection with FIG. 14, may provide a means to transmit the packet.

At block 1906, the wireless communication device may receive first feedback information indicating an acknowledgement or negative acknowledgement of the packet on a first periodic feedback occasion (e.g., a periodic sidelink feedback occasion) associated with the periodic sidelink occasion. For example, the first feedback information may be received within a PSFCH on the first periodic feedback occasion. For example, the feedback management circuitry 1446, together with the communication and processing circuitry 1442 and transceiver 1410, shown and described above in connection with FIG. 14, may provide a means to receive the feedback information.

At block 1908, the wireless communication device may transmit the packet utilizing a periodic uplink occasion of the periodic uplink occasions to the base station. For example, the SPS management circuitry 1444, together with the communication and processing circuitry 1442 and transceiver 1410, shown and described above in connection with FIG. 14, may provide a means to transmit the packet.

At block 1910, the wireless communication device may receive second feedback information on a second periodic feedback occasion (e.g., a periodic downlink feedback occasion) associated with the periodic uplink occasion from the base station. For example, the second feedback information may be received within a PDCCH on the second periodic feedback occasion. In some examples, the wireless communication device may further forward at least the second feedback information to the source device. For example, the feedback management circuitry 1446, together with the communication and processing circuitry 1442 and transceiver 1410, shown and described above in connection with FIG. 14, may provide a means to receive the feedback information.

Figure 20:
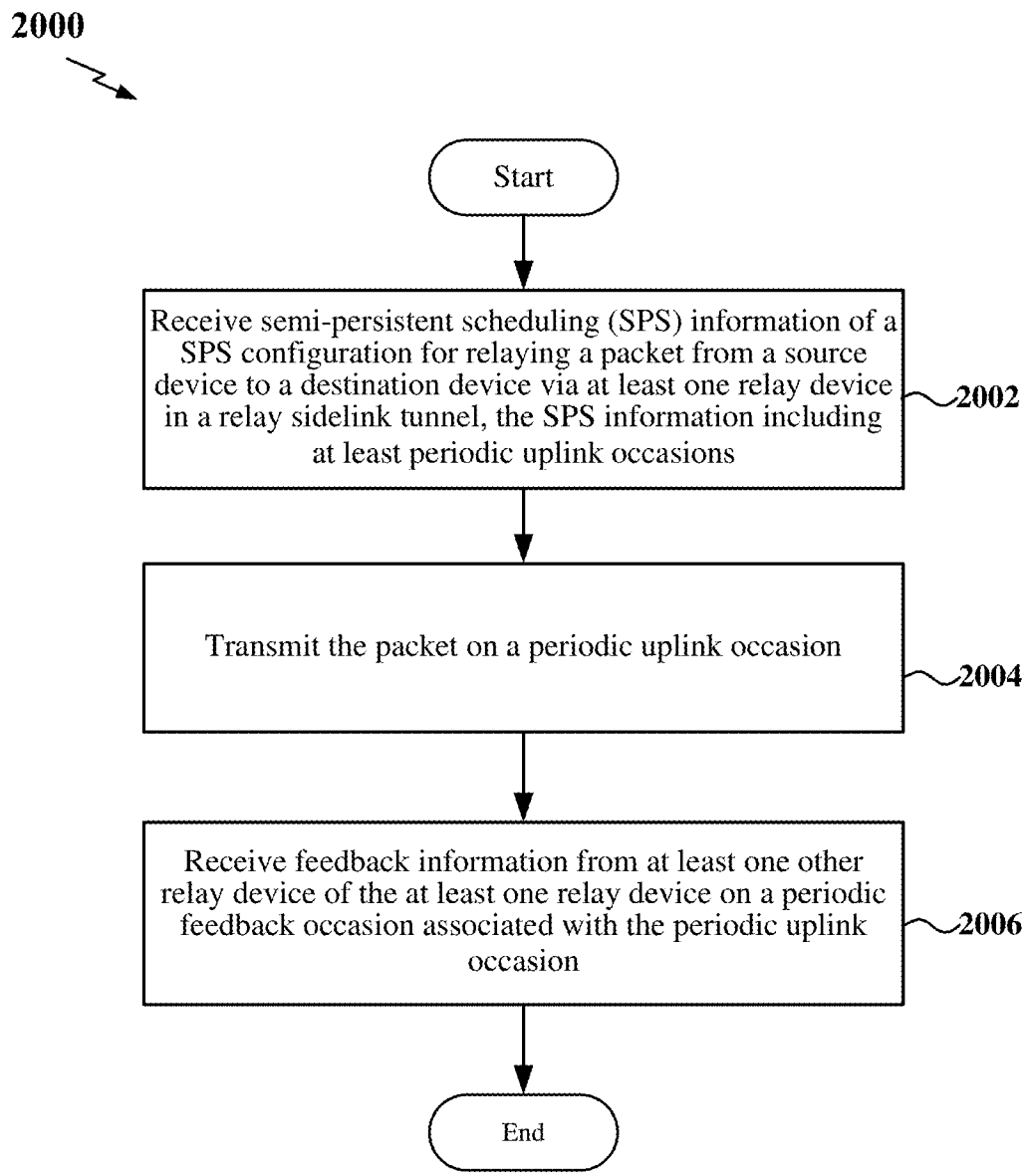
FIG. 20 is a flow chart of another exemplary method for sidelink relay communication using SPS resources according to some aspects.

FIG. 20 is a flow chart 2000 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 2002, the wireless communication device (e.g., a UE configured for sidelink communication) may receive semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In examples in which the destination device is a base station, the periodic transmit occasions may include periodic sidelink occasions and periodic uplink occasions. For example, the SPS management circuitry 1444, together with the communication and processing circuitry 1442 and transceiver 1410, shown and described above in connection with FIG. 14, may provide a means to identify the SPS information.

At block 2004, the wireless communication device may transmit the packet utilizing a periodic uplink occasion of the periodic uplink occasions to the base station. For example, the SPS management circuitry 1444, together with the communication and processing circuitry 1442 and transceiver 1410, shown and described above in connection with FIG. 14, may provide a means to transmit the packet.

At block 2006, the wireless communication device may receive feedback information from at least one other relay device of the at least one relay device on a periodic feedback occasion (e.g., a periodic uplink feedback occasion) associated with the periodic uplink occasion. For example, one or more relay devices at hop j may be configured to monitor the periodic uplink occasions of one or more relay devices at hop j–1. In this example, the relay device(s) at hop j may transmit feedback information to the wireless communication device using the periodic feedback occasion. In some examples, the feedback information is transmitted within a PUCCH on the periodic feedback occasion. For example, the feedback management circuitry 1446, together with the communication and processing circuitry 1442 and transceiver 1410, shown and described above in connection with FIG. 14, may provide a means to receive the feedback information.

Figure 21:
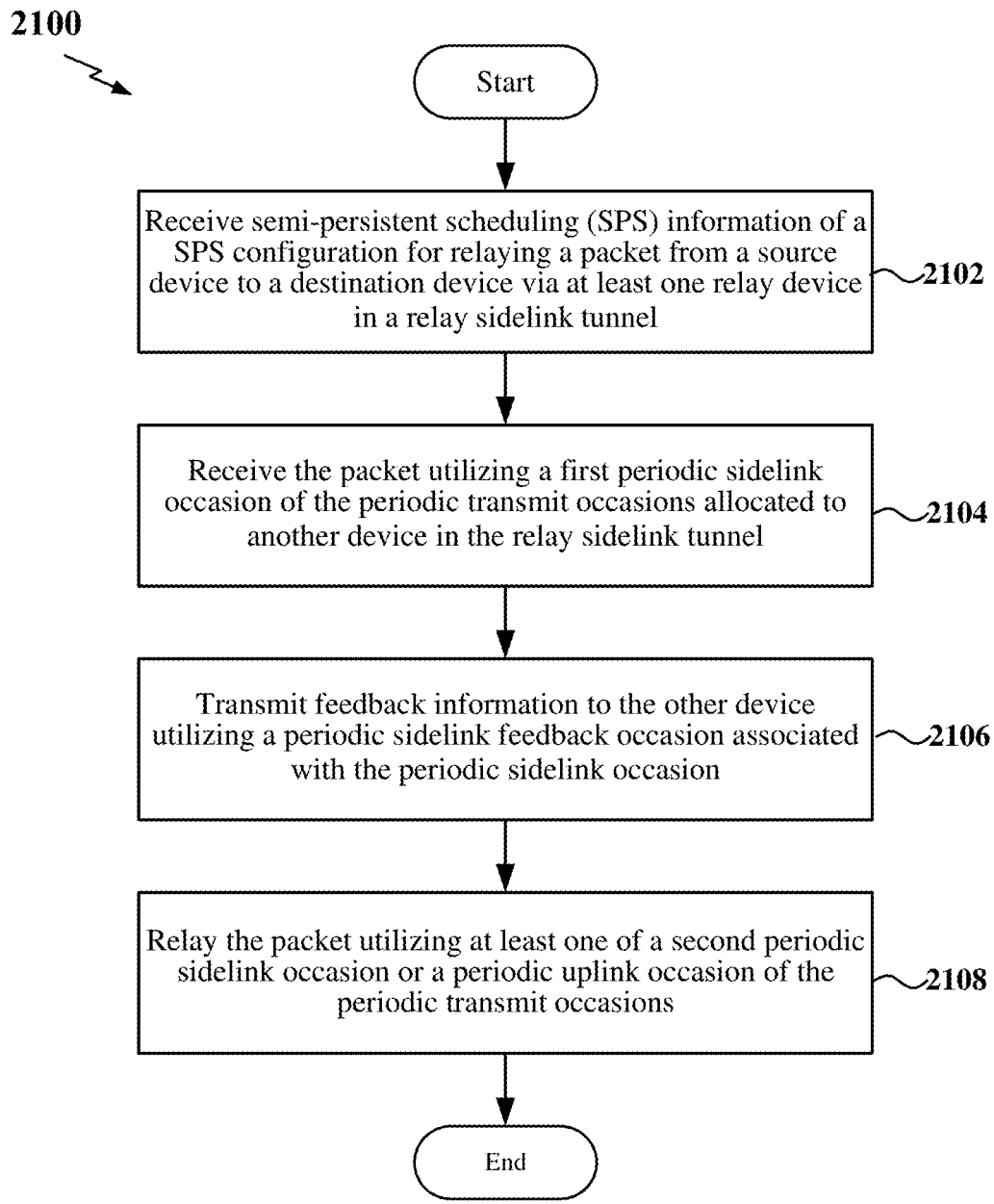
FIG. 21 is a flow chart of another exemplary method for sidelink relay communication using SPS resources according to some aspects.

FIG. 21 is a flow chart 2100 of another exemplary method for sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the wireless communication device 1400, as described above and illustrated in FIG. 14, by a processor or processing system, or by any suitable means for carrying out the described functions.

At block 2102, the wireless communication device (e.g., a UE configured for sidelink communication) may receive semi-persistent scheduling (SPS) information of a SPS configuration for relaying a packet from a source device to a destination device via at least one relay device in a relay sidelink tunnel. The SPS information can include periodic transmit occasions for the source device and the at least one relay device. In examples in which the destination device is a base station, the periodic transmit occasions may include periodic sidelink occasions and periodic uplink occasions.

For example, the SPS management circuitry 1444, together with the communication and processing circuitry 1442 and transceiver 1410, shown and described above in connection with FIG. 14, may provide a means to identify the SPS information.

At block 2104, the wireless communication device may receive the packet utilizing a first periodic sidelink occasion of the periodic transmit occasions allocated to another device in the relay sidelink tunnel. For example, the wireless communication device may receive the packet from the source device or from another relay device. For example, the SPS management circuitry 1444, together with the communication and processing circuitry 1442 and transceiver 1410, shown and described above in connection with FIG. 14, may provide a means to receive the packet.

At block 2106, the wireless communication device may transmit feedback information indicating an acknowledgement or negative acknowledgement of the packet utilizing a periodic sidelink feedback occasion associated with the periodic sidelink occasion. For example, the feedback information may be transmitted within a PSFCH on the first periodic feedback occasion. For example, the feedback management circuitry 1446, together with the communication and processing circuitry 1442 and transceiver 1410, shown and described above in connection with FIG. 14, may provide a means to transmit the feedback information.

At block 2108, the wireless communication device may relay (forward) the packet utilizing a second periodic sidelink occasion or a periodic uplink occasion of the periodic transmit occasions. For example, the wireless communication device may relay the packet to the destination device and/or one or more other relay devices. For example, the SPS management circuitry 1444, together with the communication and processing circuitry 1442 and transceiver 1410, shown and described above in connection with FIG. 14, may provide a means to transmit the packet.

In one configuration, the wireless communication device 1400 includes means for relaying communication using SPS resources and providing feedback information as described in the present disclosure. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 6, and/or 9, and utilizing, for example, the processes and/or algorithms described herein in relation to FIGS. 15-21.

Figure 22:
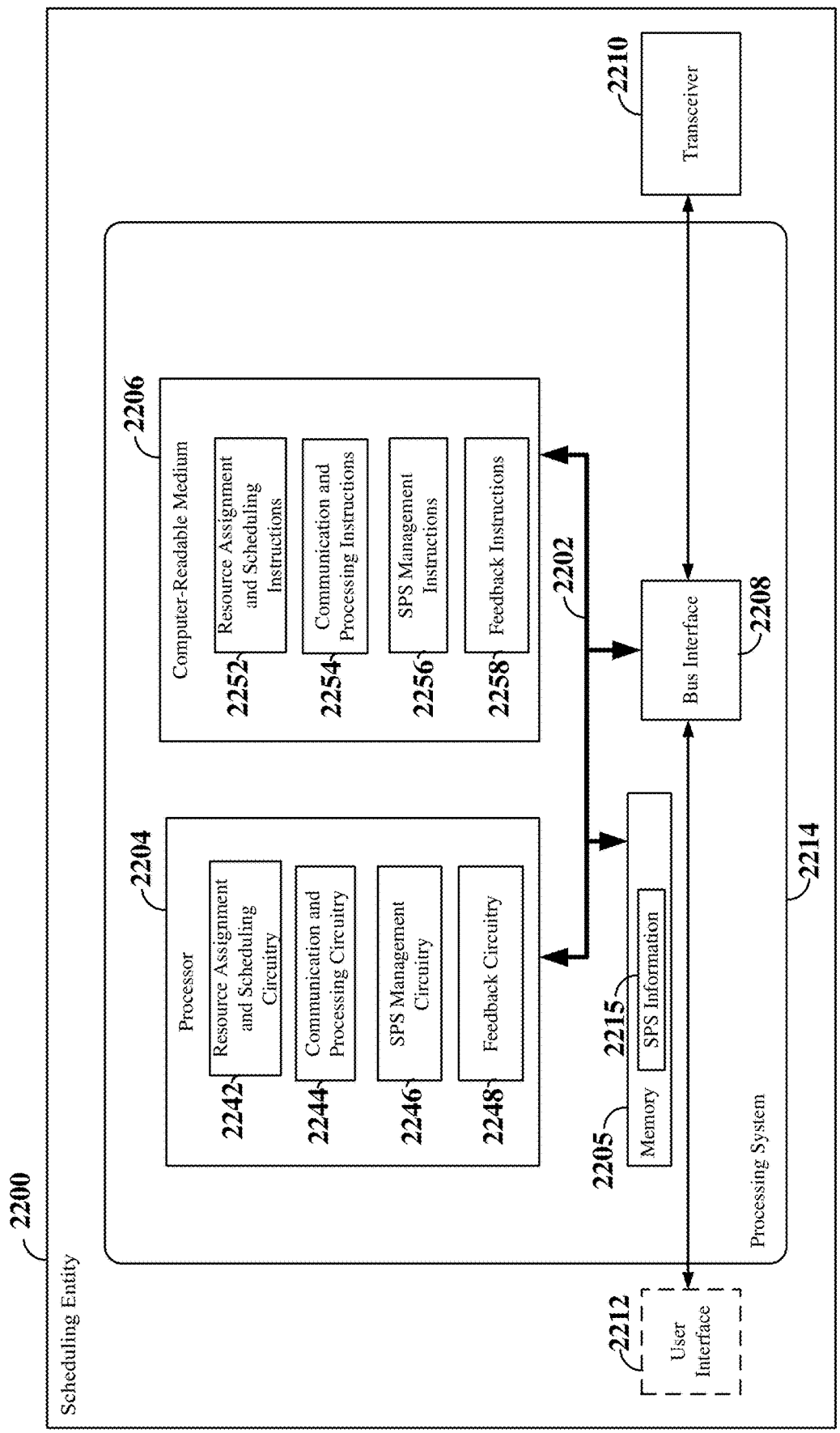
FIG. 22 is a block diagram illustrating an example of a hardware implementation for a scheduling entity employing a processing system according to some aspects.

FIG. 22 is a conceptual diagram illustrating an example of a hardware implementation for an exemplary scheduling entity 2200 employing a processing system 2214. For example, the scheduling entity 2200 may correspond to any of the base stations (e.g., gNBs) or scheduling entities shown in any one or more of FIGS. 1, 2, 6 and/or 9. The scheduling entity 2200 may further correspond to a sidelink device, such as a source sidelink device or a relay sidelink device, as shown and described above in reference to FIGS. 1, 2, 6, and/or 9.

In accordance with various aspects of the disclosure, an element, or any portion of an element, or any combination of elements may be implemented with a processing system 2214 that includes one or more processors 2204. The processing system 2214 may be substantially the same as the processing system 1014 illustrated in FIG. 10, including a bus interface 2208, a bus 2202, memory 2205, a processor 2204, and a computer-readable medium 2206. Furthermore, the scheduling entity 2200 may include an optional user interface 2212 and a transceiver 2210. The processor 2204, as utilized in a scheduling entity 2200, may be used to implement any one or more of the processes described below.

The processor 2204 may include resource assignment and scheduling circuitry 2242, configured to generate, schedule, and modify a resource assignment or grant of time-frequency resources (e.g., a set of one or more resource elements). For example, the resource assignment and scheduling circuitry 2242 may be configured to allocate/schedule semi-persistent scheduling (SPS) resources associated with an SPS configuration for relaying a packet from a source device to a destination device via at least one relay device in a relay sidelink tunnel. The SRS resources may include, for example, periodic transmit occasions for the source device and the at least one relay device. In examples in which the scheduling entity is a base station, the periodic transmit occasions may include periodic uplink occasions for at least one of the relay devices. Periodic uplink occasions may further be scheduled for other relay devices and/or the source device when the other relay device(s) and/or source device has a Uu link with the base station. For Mode 1 sidelink, the periodic transmit occasions scheduled by the resource assignment and scheduling circuitry 2242 in the base station may further include periodic sidelink occasions for the source device and each of the at least one relay device.

In examples in which the scheduling entity is a sidelink device (e.g., the source device, the destination sidelink device, or a scheduling sidelink device, such as one of the relay devices), the periodic transmit occasions scheduled by the resource assignment and scheduling circuitry 2242 may include periodic sidelink occasions. For Mode 2 sidelink, the scheduling entity may include both the base station scheduling the periodic uplink occasions and the scheduling sidelink device scheduling the periodic sidelink occasions.

In examples in which the scheduling entity is a base station, the resource assignment and scheduling circuitry 2242 may further schedule periodic downlink feedback occasions on which the base station may transmit feedback information to the relay device(s) and/or the source device. In addition, the resource assignment and scheduling circuitry 2242 may further schedule periodic uplink feedback occasions on which relay devices may transmit feedback information associated with the periodic uplink occasions of other relay devices or the source device. The resource assignment and scheduling circuitry 2242 may further be configured to execute resource assignment and scheduling instructions (software) 2252 stored in the computer-readable medium 2206 to implement one or more of the functions described herein.

The processor 2204 may further include communication and processing circuitry 2244 configured to communicate with at least one of the relay devices via a Uu link or a sidelink. In some examples, the communication and processing circuitry 2244 may further be configured to communicate with the source device via a Uu link or a sidelink. In examples in which the scheduling entity includes the source device, the communication and processing circuitry 2244 may further be configured to communicate with the destination sidelink device or the base station via a sidelink or Uu link, respectively.

The communication and processing circuitry 2244 may be configured to transmit SPS information including the periodic transmit occasions associated with the SPS configuration. For example, the SPS information may be transmitted within downlink control information (DCI). In examples in which the scheduling entity 2200 is the base station, the communication and processing circuitry 2244 may further be configured to transmit feedback information on the scheduled periodic downlink feedback occasions.

The communication and processing circuitry 2244 may further be configured to receive a packet from the source device or a relay device utilizing one of the periodic transmit occasions (e.g., a periodic uplink occasion when the scheduling entity is the base station and a periodic sidelink occasion when the scheduling entity is the scheduling sidelink device). In addition, the communication and processing circuitry 2244 may be configured to transmit feedback information indicating an acknowledgement or negative acknowledgement of the packet on a periodic feedback occasion (e.g., a periodic downlink feedback occasion or a periodic sidelink feedback occasion) associated with the periodic transmit occasion. The communication and processing circuitry 2244 may further be configured to execute communication and processing instructions (software) 2254 stored in the computer-readable medium 2206 to implement one or more of the functions described herein.

The processor 2204 may further include SPS management circuitry 2246, configured to manage the SPS configuration for the relay sidelink tunnel. For example, the SPS management circuitry 2246 may configure a respective periodicity p for the periodic transmit occasions allocated to at least the relay devices (and the source device in examples in which the scheduling entity is the base station or scheduling sidelink device). In examples in which the scheduling entity 2200 is the base station, the SPS management circuitry 2246 may further be configured to configure a respective K1 for the periodic uplink occasions scheduled for each of the devices. Based on the configured K1, the resource assignment and scheduling circuitry 2242 may schedule the periodic downlink feedback occasions. The SPS management circuitry 2246 may further be configured to generate the SPS information including the respective periodic transmit occasions allocated to the source device and each of the relay devices. In some examples, the SPS information may further include a tunnel configuration that identifies a number of hops and the relay devices in each of the hops, along with an order of transmission of each of the relay devices (e.g., the order of periodic transmit occasions allocated to each of the relay devices) in each of the hops. In addition, the SPS information may further include other tunnel configuration information, including the relaying type assigned to each relay device and each link (sidelink and/or uplink) associated with each relay device.

The SPS management circuitry 2246 may further be configured to operate together with the communication and processing circuitry 2244 to receive the packet from a relay device or the source device on a respective periodic transmit occasion associated with the relay device or the source device. The SPS management circuitry 2246 may further be configured to execute SPS management instructions (software) 2256 stored in the computer-readable medium 2206 to implement one or more of the functions described herein.

The processor 2204 may further include feedback management circuitry 2248, configured to operate together with the communication and processing circuitry 2244 to generate and transmit feedback information indicating an acknowledgement or negative acknowledgement of the packet on a periodic feedback occasion associated with the periodic transmit occasion. In some examples, the periodic feedback occasion is a periodic downlink feedback occasion, and the feedback information may be transmitted within a PDCCH on the periodic downlink feedback occasion.

In some examples, based on the K1 configured for each device in the relay sidelink tunnel having a Uu link with the base station, the feedback management circuitry 2248 may be configured to transmit feedback information after one or more subsequent periodic transmit (uplink) occasions associated with a hop in the relay sidelink tunnel. In this example, the feedback management circuitry 2248 may further include respective additional feedback information for each of the one or more subsequent periodic transmit occasions on the same periodic downlink feedback occasion. The feedback management circuitry 2248 may further be configured to execute feedback management instructions (software) 2258 stored in the computer-readable medium 2206 to implement one or more of the functions described herein.

FIG. 23 is a flow chart of an exemplary method for facilitating sidelink relay communication using SPS resources according to some aspects. As described below, some or all illustrated features may be omitted in a particular implementation within the scope of the present disclosure, and some illustrated features may not be required for implementation of all embodiments. In some examples, the method may be performed by the scheduling entity, as described above and illustrated in FIG. 22, by a processor or processing system, or by any suitable means for carrying out the described functions.

At block 2302, the scheduling entity (e.g., a base station or scheduling sidelink device) may transmit, to at least one relay device, semi-persistent scheduling (SPS) information associated with a SPS configuration for relaying a packet from a source device to a destination device via the at least one relay device in a relay sidelink tunnel. The SPS information can include periodic transmit occasions for the source device and the at least one relay device. In examples in which the scheduling entity is a sidelink device (e.g., the source device, the destination sidelink device, or a scheduling sidelink device, such as one of the relay devices), the periodic transmit occasions may include periodic sidelink occasions.

In examples in which the scheduling entity is the destination device and the destination device is a base station, the periodic transmit occasions may include at least periodic uplink occasions. For example, the scheduling entity may transmit the SPS within downlink control information. In some examples, the periodic uplink occasions may be associated with at least one of the relay devices. In other examples, the periodic transmit occasions may further include periodic uplink occasions for other relay devices and/or the source device when the other relay device(s) and/or source device has a Uu link with the base station. For Mode 1 sidelink, the periodic transmit occasions may further include periodic sidelink occasions for the source device and each of the at least one relay device.

In some examples, the relay sidelink tunnel includes one or more hops, each including one or more relay devices of the at least one relay device. In this example, the SPS information may identify each of the one or more relay devices in each of the one or more hops and an order of transmission of each of the one or more relay devices utilizing respective ones of the periodic transmit occasions. For example, the SPS management circuitry 2246, together with the communication and processing circuitry 2244 and transceiver 2210, shown and described above in connection with FIG. 22 may provide a means to transmit the SPS information.

At block 2304, the scheduling entity may receive the packet utilizing a periodic transmit occasion of the periodic transmit occasions. For example, the scheduling entity may receive the packet on a periodic sidelink occasion (e.g., when the scheduling entity is the scheduling sidelink device) or on a periodic uplink occasion (e.g., when the scheduling entity is the base station). For example, the SPS management circuitry 2246, together with the communication and processing circuitry 2244 and transceiver 2410, shown and described above in connection with FIG. 22 may provide a means to receive the packet.

At block 2306, the scheduling entity may transmit feedback information indicating an acknowledgement or negative acknowledgement of the packet on a periodic feedback occasion associated with the periodic transmit occasion. In some examples, the scheduling entity may transmit the feedback information indicating the acknowledgement or the negative acknowledgement of the packet after one or more subsequent periodic transmit occasions of the periodic transmit occasions associated with a hop of one or more hops in the relay sidelink tunnel. In this example, the feedback information further indicates a respective additional acknowledgement or negative acknowledgement for each of the one or more subsequent periodic transmit occasions. In some examples, the periodic feedback occasion is a periodic downlink feedback occasion, and the feedback information is transmitted within a PDCCH. In some examples, the periodic feedback occasion is a periodic sidelink feedback occasion, and the feedback information is transmitted within a PSFCH. For example, the feedback management circuitry 2248, together with the communication and processing circuitry 2244 and transceiver 2410, shown and described above in connection with FIG. 22 may provide a means to transmit the feedback information.

In one configuration, the scheduling entity 2200 includes means for configuring SPS resources for relaying communication as described in the present disclosure. In one aspect, the aforementioned means may be the processor 2204 shown in FIG. 22 configured to perform the functions recited by the aforementioned means. In another aspect, the aforementioned means may be a circuit or any apparatus configured to perform the functions recited by the aforementioned means.

Of course, in the above examples, the circuitry included in the processor 2204 is merely provided as an example, and other means for carrying out the described functions may be included within various aspects of the present disclosure, including but not limited to the instructions stored in the computer-readable storage medium 2206, or any other suitable apparatus or means described in any one of the FIGS. 1, 2, 6, and/or 9, and utilizing, for example, the processes and/or algorithms described herein in relation to FIG. 23.

The processes shown in FIGS. 15-21 and 23 may include additional aspects, such as any single aspect or any combination of aspects described below and/or in connection with one or more other processes described elsewhere herein.

Aspect 1: A method for wireless communication at a wireless communication device in a wireless communication network, the method comprising: identifying semi-persistent scheduling (SPS) information associated with a SPS configuration for relaying a packet from a source device to a destination device via at least one relay device in a relay sidelink tunnel, the SPS information comprising periodic transmit occasions for the source device and the at least one relay device; and transmitting the packet utilizing a periodic transmit occasion of the periodic transmit occasions.

Aspect 2: The method of aspect 1, wherein the identifying the SPS information further comprises: receiving the SPS information from at least one of the destination device or a relay device of the at least one relay device, wherein the destination device comprises a base station or a destination sidelink device.

Aspect 3: The method of aspect 2, wherein the receiving the SPS information further comprises: receiving the SPS information from the base station within downlink control information.

Aspect 4: The method of any of aspects 1 through 3, further comprising: forwarding the SPS information to the source device via a sidelink, Aspect 5: The method of aspect 4, wherein the forwarding the SPS information to the source device further comprises: forwarding the SPS information to the source device in a single frequency network (SFN) manner.

Aspect 6: The method of any of aspects 1 through 5, wherein the relay sidelink tunnel comprises one or more hops, each comprising one or more relay devices of the at least one relay device.

Aspect 7: The method of aspect 6, further comprising: retransmitting the packet up to a maximum number of retransmissions utilizing subsequent periodic transmit occasions based on the SPS information until a respective acknowledgement of the packet is received from at least one of the destination device or all of the one or more relay devices in a hop of the one or more hops.

Aspect 8: The method of aspect 7, wherein the wireless communication device is the source device, and further comprising: deactivating the SPS configuration or transmitting a new packet utilizing the SPS configuration based on the maximum number of retransmissions being reached or the respective acknowledgement being received from the destination device or all of the one or more relay devices in the hop.

Aspect 9: The method of any of aspects 6 through 8, further comprising: receiving feedback information indicating an acknowledgement or negative acknowledgement of the packet after one or more subsequent periodic transmit occasions of the periodic transmit occasions associated with a hop of the one or more hops, wherein the feedback information further indicates a respective additional acknowledgement or negative acknowledgement for each of the one or more subsequent periodic transmit occasions.

Aspect 10: The method of any of aspects 6 through 9, wherein the one or more relay devices in a hop of the one or more hops comprises a plurality of relay devices comprising the wireless communication device, and wherein the transmitting the packet further comprises: transmitting the packet within a same time slot and on orthogonal or non-orthogonal resources utilized by each of the plurality of relay devices in the hop to transmit the packet.

Aspect 11: The method of any of aspects 6 through 10, wherein the periodic transmit occasion comprises a periodic sidelink occasion and, further comprising: receiving feedback information indicating an acknowledgement or negative acknowledgement of the packet on a periodic sidelink feedback occasion associated with the periodic sidelink occasion.

Aspect 12: The method of aspect 11, wherein the one or more relay devices in a hop of the one or more hops comprises a plurality of relay devices, and wherein the transmitting the packet further comprises: transmitting the packet utilizing the periodic sidelink occasion to the plurality of relay devices in the hop using a common virtual relay identifier (ID) as a destination ID for all relay devices of the plurality of relay devices in the hop, wherein the common virtual relay ID identifies the periodic sidelink feedback occasion and the feedback information comprises respective feedback information from each of the plurality of relay devices in the hop.

Aspect 13: The method of aspect 12, wherein the transmitting the packet utilizing the periodic sidelink occasion to the plurality of relay devices in the hop using the common virtual relay ID further comprises: transmitting the common virtual relay ID within second stage sidelink control information or a medium access control control element (MAC-CE) associated with a physical sidelink control channel comprising the packet.

Aspect 14: The method of aspect 11, wherein the transmitting the packet further comprises: transmitting the packet to a relay device of the one or more relay devices in a hop of the one or more hops using a physical relay identifier (ID) of the relay device.

Aspect 15: The method of any of aspects 1 through 14, wherein: the destination device comprises a base station; and the periodic transmit occasions comprise periodic sidelink occasions and periodic uplink occasions.

Aspect 16: The method of aspect 15, wherein the identifying the SPS information further comprises: receiving the periodic uplink occasions from the base station; and receiving the periodic sidelink occasions from a scheduling sidelink device allocating the periodic sidelink occasions.

Aspect 17: The method of aspect 15 or 16, wherein the transmitting the packet further comprises: transmitting the packet utilizing a periodic sidelink occasion of the periodic sidelink occasions; and transmitting the packet utilizing a periodic uplink occasion of the periodic uplink occasions.

Aspect 18: The method of aspect 17, further comprising: receiving first feedback information on a first periodic feedback occasion associated with the periodic sidelink occasion; and receiving second feedback information on a second periodic feedback occasion associated with the periodic uplink occasion.

Aspect 19: The method of aspect 18, further comprising: forwarding at least the second feedback information to the source device.

Aspect 20: The method of aspect 18 or 19, wherein the wireless communication device is a relay device of the at least one relay device, and further comprising: receiving third feedback information from at least one other relay device of the at least one relay device on a third periodic feedback occasion associated with the periodic uplink occasion.

Aspect 21: The method of aspect 20, wherein the first feedback information is received within a physical downlink control channel, the second feedback information is received within a physical sidelink feedback channel, and the third feedback information is received within a physical uplink control channel.

Aspect 22: The method of aspect 15 or 16, wherein the transmitting the packet further comprises: transmitting the packet utilizing a periodic uplink occasion of the periodic uplink occasions.

Aspect 23: The method of any of aspects 1 through 22, further comprising: receiving the packet utilizing a first periodic sidelink occasion of the periodic transmit occasions allocated to another device in the relay sidelink tunnel; transmitting feedback information to the other device utilizing a periodic sidelink feedback occasion associated with the first periodic sidelink occasion; and relaying the packet utilizing at least one of a second periodic sidelink occasion or a periodic uplink occasion of the periodic transmit occasions allocated to the wireless communication device.

Aspect 24: A method for wireless communication at a scheduling entity in a wireless communication network, the method comprising: transmitting, to at least one relay device, semi-persistent scheduling (SPS) information associated with a SPS configuration for relaying a packet from a source device to a destination device via the at least one relay device in a relay sidelink tunnel, the SPS information comprising periodic transmit occasions for the source device and the at least one relay device; receiving the packet utilizing a periodic transmit occasion of the periodic transmit occasions; and transmitting feedback information indicating an acknowledgement or negative acknowledgement of the packet on a periodic feedback occasion associated with the periodic transmit occasion.

Aspect 25: The method of aspect 24, wherein the scheduling entity is the destination device and the destination device comprises a base station, and wherein the transmitting the SPS information further comprises: transmitting the SPS information within downlink control information, wherein the periodic transmit occasions comprise at least periodic uplink occasions.

Aspect 26: The method of aspect 24 or 25, wherein the periodic transmit occasions comprise at least periodic sidelink occasions.

Aspect 27: The method of any of aspects 24 through 26, wherein the transmitting the feedback information comprises: transmitting the feedback information indicating the acknowledgement or the negative acknowledgement of the packet after one or more subsequent periodic transmit occasions of the periodic transmit occasions associated with a hop of one or more hops in the relay sidelink tunnel, wherein the feedback information further indicates respective additional feedback information for each of the one or more subsequent periodic transmit occasions.

Aspect 28: The method of any of aspects 24 through 27, wherein the relay sidelink tunnel comprises one or more hops, each comprising one or more relay devices of the at least one relay device, and wherein the SPS information identifies each of the one or more relay devices in each of the one or more hops and an order of transmission of each of the one or more relay devices utilizing respective ones of the periodic transmit occasions.

Aspect 29: An apparatus in a wireless communication network comprising a wireless transceiver, a memory, and a processor coupled to the wireless transceiver and the memory, the processor and the memory configured to perform a method of any one of aspects 1 through 23 or aspects 24 through 28.

Aspect 30: An apparatus in a wireless communication network comprising at least one means for performing a method of any one of aspects 1 through 23 or aspects 24 through 28.

Aspect 31: A non-transitory computer-readable medium storing computer-executable code, comprising code for causing an apparatus in a wireless communication network to perform a method of any one of aspects 1 through 23 or aspects 24 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 6, 14 and/or 22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device in a wireless communication network, the method comprising:
identifying semi-persistent scheduling (SPS) information associated with a SPS configuration for relaying a packet from a source device to a destination device via at least one relay device in a relay sidelink tunnel, the SPS information comprising periodic transmit occasions for the source device to transmit the packet to the at least one relay device and for the at least one relay device to transmit the packet to the destination device;
transmitting the packet utilizing a periodic transmit occasion of the periodic transmit occasions; and
receiving feedback information indicating an acknowledgement or negative acknowledgement of the packet on a periodic feedback occasion associated with the periodic transmit occasion after one or more subsequent periodic transmit occasions of the periodic transmit occasions associated with a hop of one or more hops in the relay sidelink tunnel.

2. The method of claim 1, wherein the identifying the SPS information further comprises:
receiving the SPS information from at least one of the destination device or a relay device of the at least one relay device, wherein the destination device comprises a base station or a destination sidelink device.

3. The method of claim 2, wherein the receiving the SPS information further comprises:
receiving the SPS information from the base station within downlink control information.

4. The method of claim 2, further comprising:
forwarding the SPS information to the source device via a sidelink.

5. The method of claim 4, wherein the forwarding the SPS information to the source device further comprises:
forwarding the SPS information to the source device in a single frequency network (SFN) manner.

6. The method of claim 1, wherein the each of the one or more hops comprises one or more relay devices of the at least one relay device.

7. The method of claim 6, further comprising:
retransmitting the packet up to a maximum number of retransmissions utilizing subsequent periodic transmit occasions based on the SPS information until a respective acknowledgement of the packet is received from at least one of the destination device or all of the one or more relay devices in a hop of the one or more hops.

8. The method of claim 7, wherein the wireless communication device is the source device, and further comprising:
deactivating the SPS configuration or transmitting a new packet utilizing the SPS configuration based on the maximum number of retransmissions being reached or the respective acknowledgement being received from the destination device or all of the one or more relay devices in the hop.

9. The method of claim 6,
wherein the feedback information further indicates a respective additional acknowledgement or negative acknowledgement for each of the one or more subsequent periodic transmit occasions.

10. The method of claim 6, wherein the one or more relay devices in a hop of the one or more hops comprises a plurality of relay devices comprising the wireless communication device, and wherein the transmitting the packet further comprises:
transmitting the packet within a same time slot and on orthogonal or non-orthogonal resources utilized by each of the plurality of relay devices in the hop to transmit the packet.

11. The method of claim 6, wherein the periodic transmit occasion comprises a periodic sidelink occasion and, wherein the periodic feedback occasion comprises:
on a periodic sidelink feedback occasion associated with the periodic sidelink occasion.

12. The method of claim 11, wherein the one or more relay devices in a hop of the one or more hops comprises a plurality of relay devices, and wherein the transmitting the packet further comprises:
transmitting the packet utilizing the periodic sidelink occasion to the plurality of relay devices in the hop using a common virtual relay identifier (ID) as a destination ID for all relay devices of the plurality of relay devices in the hop, wherein the common virtual relay ID identifies the periodic sidelink feedback occasion and the feedback information comprises respective feedback information from each of the plurality of relay devices in the hop.

13. The method of claim 12, wherein the transmitting the packet utilizing the periodic sidelink occasion to the plurality of relay devices in the hop using the common virtual relay ID further comprises:
transmitting the common virtual relay ID within second stage sidelink control information or a medium access control control element (MAC-CE) associated with a physical sidelink control channel comprising the packet.

14. The method of claim 11, wherein the transmitting the packet further comprises:
transmitting the packet to a relay device of the one or more relay devices in a hop of the one or more hops using a physical relay identifier (ID) of the relay device.

15. The method of claim 1, wherein:
the destination device comprises a base station; and
the periodic transmit occasions comprise periodic sidelink occasions and periodic uplink occasions.

16. The method of claim 15, wherein the identifying the SPS information further comprises:
receiving the periodic uplink occasions from the base station; and
receiving the periodic sidelink occasions from a scheduling sidelink device allocating the periodic sidelink occasions.

17. The method of claim 15, wherein the transmitting the packet further comprises:

transmitting the packet utilizing a periodic sidelink occasion of the periodic sidelink occasions; and transmitting the packet utilizing a periodic uplink occasion of the periodic uplink occasions.

18. The method of claim 17, further comprising:

receiving first feedback information on a first periodic feedback occasion associated with the periodic sidelink occasion; and receiving second feedback information on a second periodic feedback occasion associated with the periodic uplink occasion.

19. The method of claim 18, further comprising:

forwarding at least the second feedback information to the source device.

20. The method of claim 18, wherein the wireless communication device is a relay device of the at least one relay device, and further comprising:

receiving third feedback information from at least one other relay device of the at least one relay device on a third periodic feedback occasion associated with the periodic uplink occasion.

21. The method of claim 20, wherein the first feedback information is received within a physical downlink control channel, the second feedback information is received within a physical sidelink feedback channel, and the third feedback information is received within a physical uplink control channel.

22. The method of claim 15, wherein the transmitting the packet further comprises:

transmitting the packet utilizing a periodic uplink occasion of the periodic uplink occasions.

23. The method of claim 1, further comprising:

receiving the packet utilizing a first periodic sidelink occasion of the periodic transmit occasions allocated to another device in the relay sidelink tunnel;

transmitting feedback information to the other device utilizing a periodic sidelink feedback occasion associated with the first periodic sidelink occasion; and relaying the packet utilizing at least one of a second periodic sidelink occasion or a periodic uplink occasion of the periodic transmit occasions allocated to the wireless communication device.

24. A wireless communication device in a wireless communication network, comprising:

a transceiver;

a memory; and a processor coupled to the transceiver and the memory, wherein the processor and the memory are configured to:

identify semi-persistent scheduling (SPS) information associated with a SPS configuration for relaying a packet from a source device to a destination device via at least one relay device in a relay sidelink tunnel, the SPS information comprising periodic transmit occasions for the source device to transmit the packet to the at least one relay device and for the at least one relay device to transmit the packet to the destination device;

transmit the packet utilizing a periodic transmit occasion of the periodic transmit occasions via the transceiver; and receive feedback information indicating an acknowledgement or negative acknowledgement of the packet on a periodic feedback occasion associated with the periodic transmit occasion after one or more subsequent periodic transmit occasions of the periodic transmit occasions associated with a hop of one or more hops in the relay sidelink tunnel.

25. A method for wireless communication at a scheduling entity in a wireless communication network, the method comprising:

transmitting, to at least one relay device, semi-persistent scheduling (SPS) information associated with a SPS configuration for relaying a packet from a source device to a destination device via the at least one relay device in a relay sidelink tunnel, the SPS information comprising periodic transmit occasions for the source device to transmit the packet to the at least one relay device and for the at least one relay device to transmit the packet to the destination device;

receiving the packet utilizing a periodic transmit occasion of the periodic transmit occasions; and transmitting feedback information indicating an acknowledgement or negative acknowledgement of the packet on a periodic feedback occasion associated with the periodic transmit occasion after one or more subsequent periodic transmit occasions of the periodic transmit occasions associated with a hop of one or more hops in the relay sidelink tunnel.

26. The method of claim 25, wherein the scheduling entity is the destination device and the destination device comprises a base station, and wherein the transmitting the SPS information further comprises:

transmitting the SPS information within downlink control information, wherein the periodic transmit occasions comprise at least periodic uplink occasions.

27. The method of claim 25, wherein the periodic transmit occasions comprise at least periodic sidelink occasions.

28. The method of claim 25, wherein the feedback information further indicates respective additional feedback information for each of the one or more subsequent periodic transmit occasions.

29. The method of claim 25, wherein each of the one or more hops comprises one or more relay devices of the at least one relay device, and wherein the SPS information identifies each of the one or more relay devices in each of the one or more hops and an order of transmission of each of the one or more relay devices utilizing respective ones of the periodic transmit occasions.

30. A scheduling entity in a wireless communication network, comprising:

a transceiver;

a memory; and a processor coupled to the transceiver and the memory, wherein the processor and the memory are configured to:

transmit, to at least one relay device, semi-persistent scheduling (SPS) information associated with a SPS configuration for relaying a packet from a source device to a destination device via the at least one relay device in a relay sidelink tunnel, the SPS information comprising periodic transmit occasions for the source device to transmit the packet to the at least one relay device and for the at least one relay device to transmit the packet to the destination device;

receive the packet utilizing a periodic transmit occasion of the periodic transmit occasions; and transmit feedback information indicating an acknowledgement or negative acknowledgement of the packet on a periodic feedback occasion associated with the periodic transmit occasion after one or more subsequent periodic transmit occasions of the periodic transmit occasions associated with a hop of one or more hops in the relay sidelink tunnel.

\* \* \* \* \*